United States Patent
Inoue

(10) Patent No.: US 6,868,137 B2
(45) Date of Patent: Mar. 15, 2005

(54) APPARATUS AND METHOD FOR A RADIATION IMAGE THROUGH A GRID

(75) Inventor: Hitoshi Inoue, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/719,331

(22) Filed: Nov. 20, 2003

(65) Prior Publication Data

US 2004/0101106 A1 May 27, 2004

Related U.S. Application Data

(60) Division of application No. 10/210,739, filed on Aug. 1, 2002, which is a continuation-in-part of application No. 09/773,095, filed on Jan. 31, 2001, now abandoned.

(30) Foreign Application Priority Data

| Feb. 4, 2000 | (JP) | ........................................ | 2000-028161 |
| Feb. 4, 2000 | (JP) | ........................................ | 2000-028207 |
| Aug. 1, 2001 | (JP) | ........................................ | 2001-233611 |

(51) Int. Cl.⁷ .............................................. H05G 1/64
(52) U.S. Cl. ........................ 378/98.4; 378/154; 378/155
(58) Field of Search .............................. 378/98.4, 154, 378/55, 207, 155, 62; 250/370.11, 370.09; 382/131, 132

(56) References Cited

U.S. PATENT DOCUMENTS

| 5,028,784 | A | * | 7/1991 | Arakawa et al. | ............ 250/584 |
| 5,050,198 | A | | 9/1991 | Honda | |
| 5,418,373 | A | | 5/1995 | Shimura | |
| 5,666,395 | A | * | 9/1997 | Tsukamoto et al. | ........ 378/98.4 |
| 5,801,385 | A | | 9/1998 | Endo et al. | |
| 6,167,115 | A | | 12/2000 | Inoue | |
| 6,201,249 | B1 | * | 3/2001 | Yamayoshi | ............ 250/370.11 |
| 6,396,074 | B1 | * | 5/2002 | Tsujii | .......................... 250/582 |
| 6,501,829 | B2 | | 12/2002 | Matsumoto et al. | ........ 378/154 |

FOREIGN PATENT DOCUMENTS

| JP | 4-336044 A | 11/1992 |
| JP | LO 8-88765 | 4/1996 |
| JP | 2507659 | 6/1996 |
| JP | LO 9-75332 | 3/1997 |
| JP | LO 9-098970 | 4/1997 |
| JP | 2754068 | 5/1998 |

OTHER PUBLICATIONS

Abstract for JP 2507659 (English version).
Abstract for JP 2754068 (English version).
Abstract for JPLO 9–098970 (English version).
Abstract for JPLO 8–88765 (English version).
Abstract for JPLO 9–75332 (English version).

* cited by examiner

Primary Examiner—David V. Bruce
Assistant Examiner—Elizabeth Keaney
(74) Attorney, Agent, or Firm—Morgan & Finnegan, L.L.P.

(57) ABSTRACT

It is an object of one of the inventions to acquire a radiation image in which a stripe pattern originating from a scattered ray removing grid is less apt to interfere with observation. An image acquisition apparatus of one of the inventions includes a sensor for spatially sampling a radiation transmission distribution of an object to be imaged at a spatial sampling interval and acquiring an image of the object, and a scattered ray removing grid for removing scattered rays from the object, wherein an interval of elements of the scattered ray removing grid is set such that a spatial frequency of a stripe pattern, in the image, which originates from the scattered ray removing grid becomes not greater than 40% of a sampling frequency that is a reciprocal of the spatial sampling interval.

12 Claims, 15 Drawing Sheets

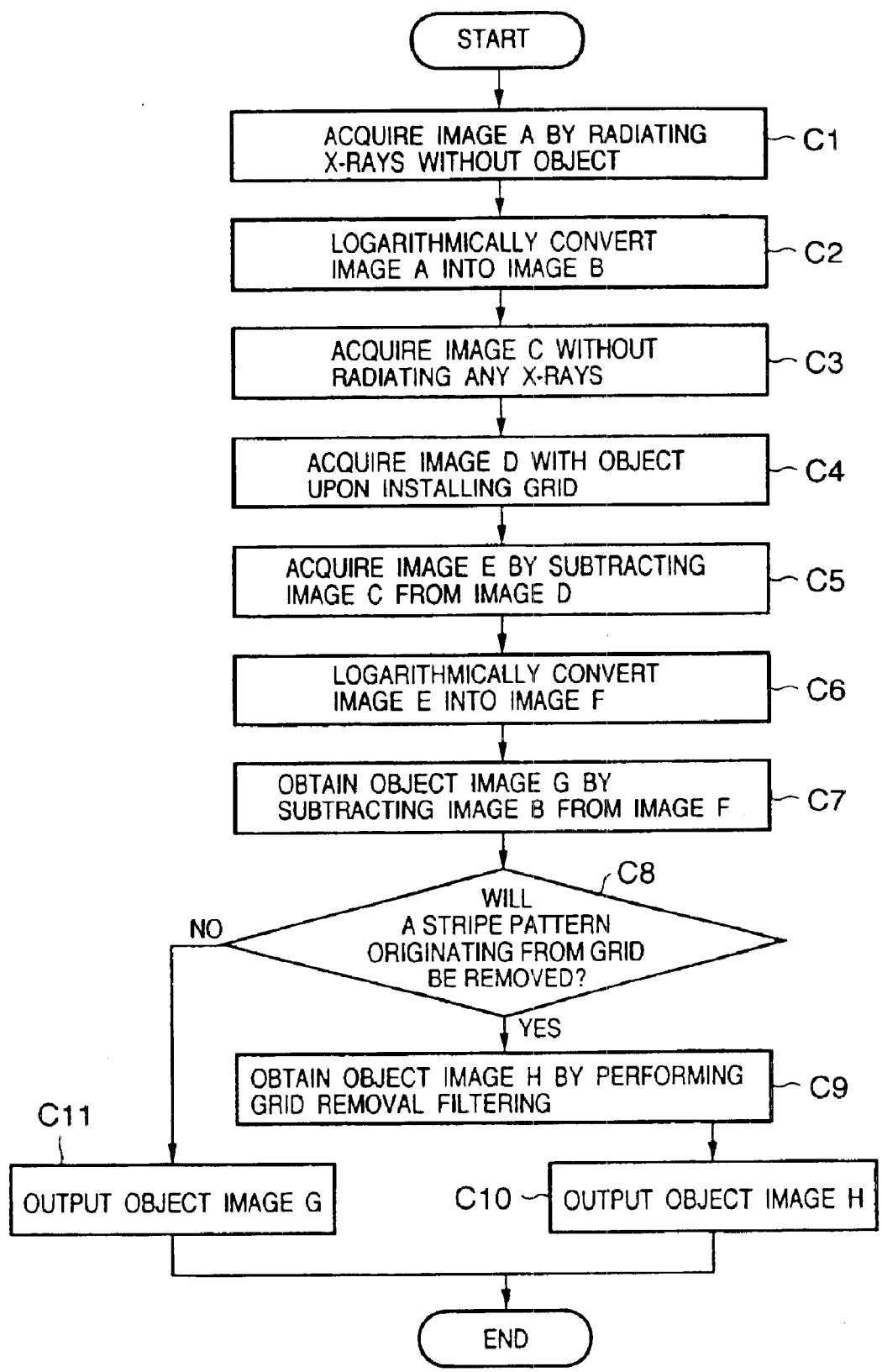

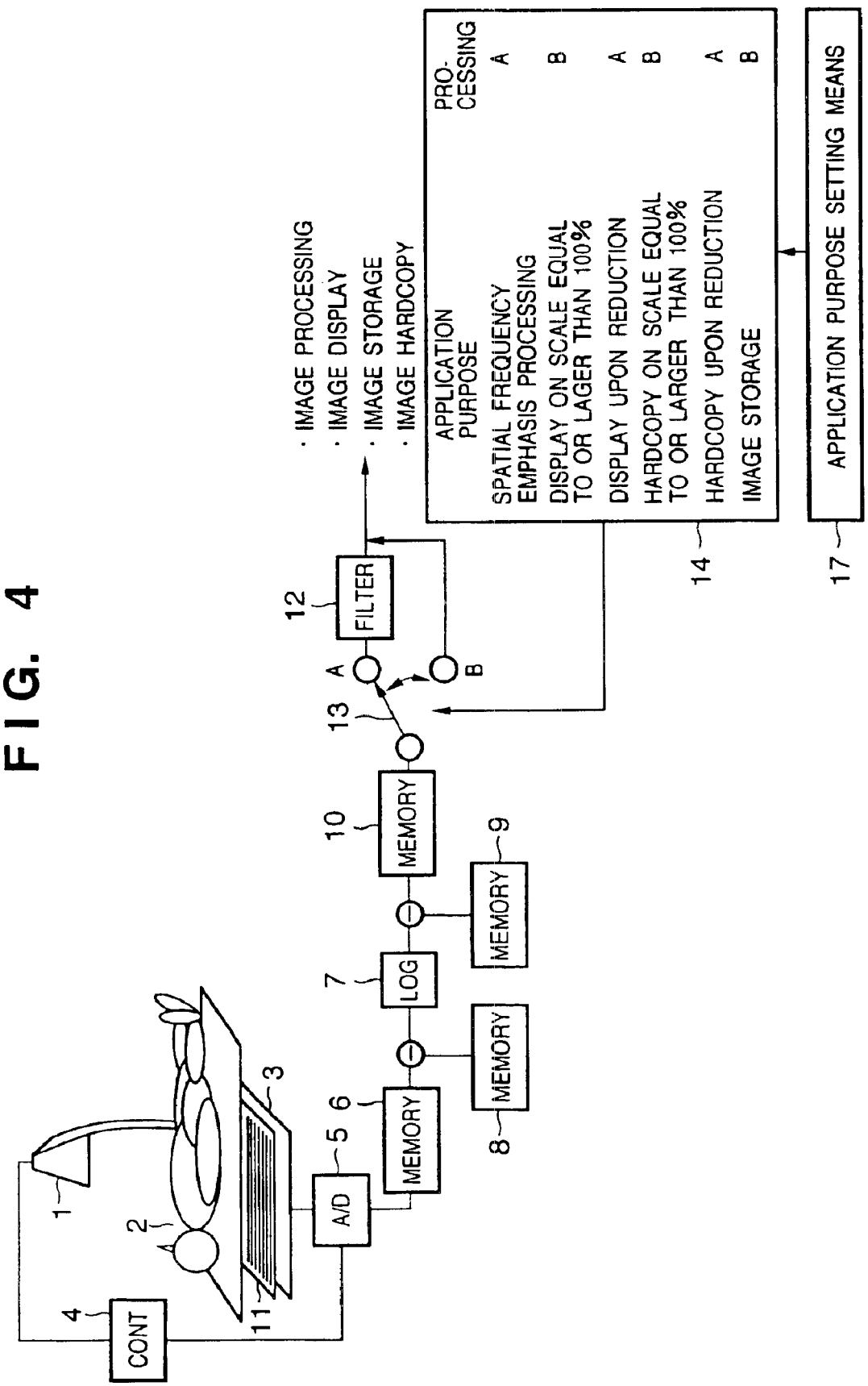

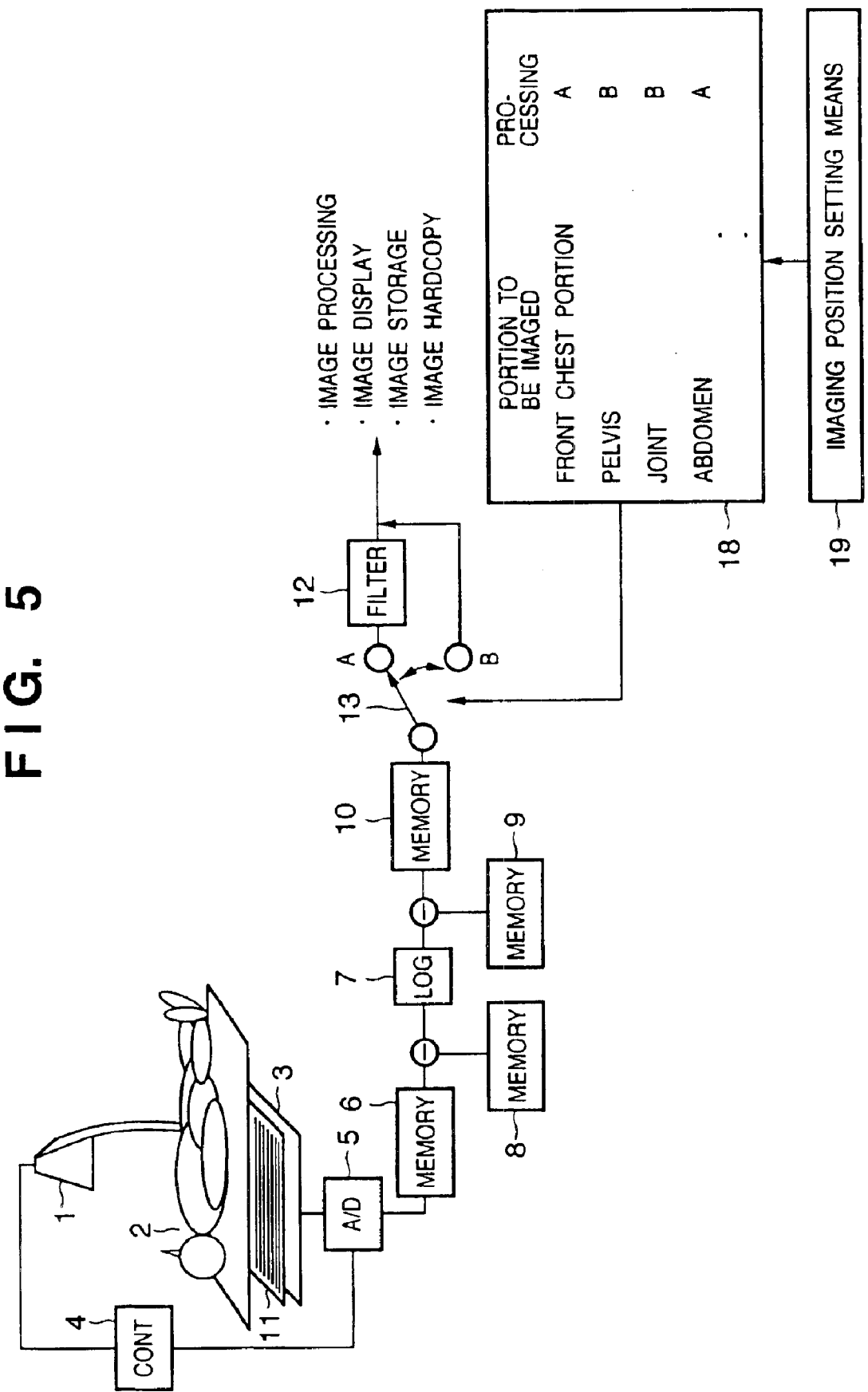

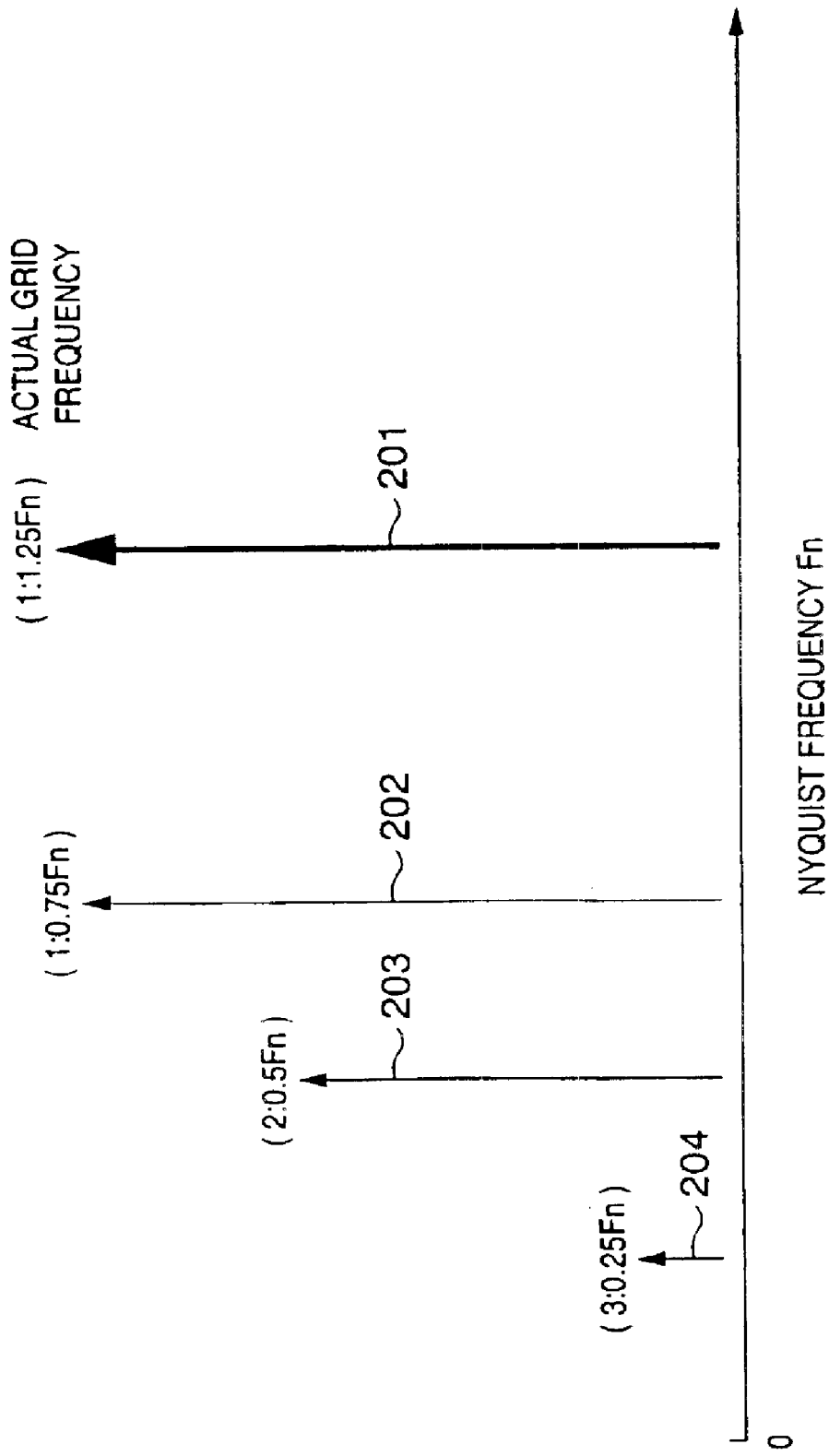

APPARATUS AND METHOD FOR A RADIATION IMAGE THROUGH A GRID

This is a divisional of prior application Ser. No. 10/210,739, filed Aug. 1, 2002, which is a continuation-in-part of U.S. Ser. No. 09/773,095, filed Jan. 31, 2001, now abandoned, to which priority under 35 U.S.C. §120 is claimed.

FIELD OF THE INVENTION

The present invention relates to an apparatus and a method for a radiation image of an object to be imaged through a grid for removing scattered rays from the object.

BACKGROUND OF THE INVENTION

With the recent trend toward the digitization of medical X-ray images, X-ray intensity spatial distributions can be acquired as digital images. For example, currently available schemes include a scheme of forming a latent image on a photostimulable phosphor by using X-ray energy and acquiring an image from a laser pumping light distribution, a scheme of converting an X-ray intensity distribution into a light intensity distribution (fluorescence), directly converting the distribution into an electrical signal by using a surface center having a plurality of pixels, and converting the signal into a digital image, and a scheme of directly converting an X-ray intensity distribution into a charge distribution.

The digitization of X-ray images has the following merits:

Storage and transfer can be efficiently performed.

Optimal images can be easily formed by digital image processing (a recovery from a failure in imaging operation can be made).

Efficient diagnosis can be carried out.

A reduction in the cost of diagnosis can be attained.

The problem of scattered X-rays produced when X-rays pass through an object has not been satisfactorily solved. To reduce the influences of scattered X-rays and obtain a high-contrast image, an optimal means is to use a scattered ray removing grid having many lead plates arranged in the same direction as in a conventional scheme using silver-halide films.

FIG. 10 is a schematic sectional view of a structure using a grid. Reference numeral 81 denotes a point (X-ray focal point) of an X-ray tube from which X-rays are generated; 82, an object; 83, a grid; 84, an energy conversion unit for converting an X-ray intensity distribution into a light intensity or charge amount; and 85, a sensor unit for spatially sampling the distribution. Scattered X-rays reflected by the object reach the grid 83 as well as X-rays directly emitted from the X-ray tube. Most of the scattered X-rays are cut by the grid 83 made up of lead members facing the X-ray focal point 81.

A drawback of the grid 83 is that it partly cuts direct X-rays while it cuts scattered X-rays. This cutting pattern corresponds to the arrangement of the lead members of the grid, and the image generally suffers a stripe pattern. An X-ray image has evolved into (1) an image formed by a film-screen system (analog image)→(2) a digital image formed by reading a latent image formed by a photostimulable phosphor by laser scanning→(3) an image formed by direct sampling (flat panel sensor) the two-dimensional spatial distribution of an X-ray dose in a two-dimensional space. Different measures have therefore been taken against a stripe pattern (grid image) on an image which originates from the lead members used for the grid 83.

In the film-screen system in (1), the following two methods are available, which are used to remove a grid image or prevent interference with observation.

(a) The grid itself is moved during radiation of X-rays to prevent the formation of a grid image while removing scattered rays.

(b) The spatial frequency of the grid stripe pattern is increased to make it difficult for the human eye to perceive a grid image if it is formed on an image or prevent the grid image from overlapping the frequency component of image information.

The means of moving the grid itself in (a) is effective in all cases of X-ray image acquisition. However, this means is difficult to use because of an increase in cost due to, for example, a driving system for moving the grid, an increase in apparatus size, the relationship between the driving timing and the X-ray radiation timing, adjustment of the driving speed, and the like.

The means of increasing the spatial frequency of the grid stripe pattern in (b) has its own limit. That is, when the frequency of the grid stripe pattern is set to a high spatial frequency at which no grid image is formed, since the thickness of each lead plate for blocking scattered rays is almost fixed, an area through which direct rays are transmitted narrows, and the use efficiency of the X-ray dose extremely decreases. As a consequence, imaging operation cannot be properly performed.

In the era in which a latent image formed by a photostimulable phosphor was read by laser scanning and digitized, the idea of using anti-aliasing filter before sampling was introduced as a method of removing a grid image. When a latent image formed by a photostimulable phosphor is to be read by laser scanning and digitized, the image is scanned in a one-dimensional direction by a laser to temporarily form a signal form like a video signal, and the signal is sampled on the time axis. The frequency of the grid stripe pattern is increased to a certain degree, and laser scanning is performed in a direction perpendicular to the grid stripe pattern to form the grid stripe pattern into a periodic signal on the video signal. A grid image can be removed by the general idea of using an anti-aliasing filter, i.e., performing sampling on the time axis after low-pass filtering in the state of an analog signal as this video signal. A similar method is disclosed in Japanese Patent No. 2507659, in which a grid image and its frequency are obtained by Fourier transformation of an image obtained by preliminary sampling, and a low-pass filter corresponding to the result is selected to remove a grid image.

According to another method, sampling is performed on the time axis at intervals shorter than desired intervals instead of performing analog low-pass filtering to eliminate aliasing of grid stripe pattern information, and the resultant information is separated from image information. Thereafter, digital low-pass filtering is performed, and the resultant image is digitally decimated (sub-sampled), thereby obtaining an image at the desired sampling intervals. Similar methods are disclosed in Japanese Patent No. 2754068 and Japanese Patent Laid-Open No. 8-088765.

In the advanced era in which a digital X-ray image can be obtained by directly sampling (using a flat panel sensor) a two-dimensional spatial distribution of an X-ray dose in (3) in a two-dimensional space, the above anti-aliasing filtering cannot be used. That is, a flat panel sensor is made up of a plurality of semiconductor pixels, and the two-dimensional spatial sampling pitch of the sensor cannot be reduced more than necessary in consideration of technique and cost. The above idea of using an anti-aliasing filter cannot be applied to this method. The method disclosed in Japanese Patent Laid-Open No. 9-75332 is aimed at removing grid stripe pattern information in contrast to the method of obtaining an X-ray image by direct sampling in a two-dimensional space. In this method, the intervals of grid lead members are perfectly matched with the sampling pitch to match areas where direct X-rays are blocked by the grid stripe pattern with the gaps between the pixels, thereby preventing a grid stripe pattern from appearing on an image.

Japanese Patent Laid-Open No. 9-98970 and U.S. Pat. No. 5,801,385 disclose methods of setting the grid lead member intervals to be smaller than the sampling pitch and equal to or near the width of the opening of a light-receiving portion of one pixel, thereby reducing the contrast of a grid stripe pattern. In the method disclosed in U.S. Pat. No. 5,050,198, a grid image is input and stored under a plurality of conditions. When imaging operation is actually performed by using the grid, the obtained image is divided by a grid image of the stored grid images which corresponds to the condition under which the actual imaging operation is performed, thereby removing the grid image.

In the method disclosed in Japanese Patent Laid-Open No. 9-75332, which corresponds to the above technique of obtaining a digital X-ray image by direct sampling in a two-dimensional space using a flat panel in the two-dimensional space, it is very difficult to perfectly match the grid lead member intervals with the sampling pitch. In the methods disclosed in Japanese Patent Laid-Open No. 9-98970 and U.S. Pat. No. 5,801,385, a grid image can be effectively removed by reducing the grid lead member intervals below the sampling pitch to be equal or near the width of the opening of a light-receiving portion of one pixel. However, as the flat panel sensor increases in resolution, and the sampling pitch becomes 0.1 mm or less, the grid lead member intervals are required to be very small; 10 or more grid lead members per mm. If the intervals become so small, since the thickness of each lead plate for blocking scattered rays is almost fixed, the areas through which direct rays pass narrow, and the use efficiency of the X-ray dose becomes extremely low. As a consequence, proper imaging operation cannot be performed.

SUMMARY OF THE INVENTION

It is an object of the present invention to acquire a radiation image in which the interference with observation due to a stripe pattern, which originates from a scattered ray removing grid, is suppressed.

It is another object of the present invention to remove a stripe pattern, which originates from a scattered ray removing grid, in a radiation image, as needed.

According to an aspect of the present invention, there is provided a radiation image acquisition apparatus characterized by comprising a sensor for spatially sampling a radiation transmission distribution of an object to be imaged at a spatial sampling interval and acquiring an image of said object, and a scattered ray removing grid for removing scattered rays from said object, wherein an interval of elements of said scattered ray removing grid is set such that a spatial frequency of a stripe pattern, in said image, which originates from said scattered ray removing grid becomes not less than $\frac{1}{3}$ and not greater than 40% of a sampling frequency that is a reciprocal of said spatial sampling interval.

It is another aspect of the present invention, there is provided a radiation image acquisition method of spatially sampling a radiation transmission distribution of an object to be imaged at a spatial sampling interval and acquiring an image of said object using a sensor and a scattered ray removing grid for removing scattered rays from said object characterized by comprising setting an interval of elements of said scattered ray removing grid such that a spatial frequency of a stripe pattern, in said image, which originates from said scattered ray removing grid becomes not less than $\frac{1}{3}$ and not greater than 40% of a sampling frequency that is a reciprocal of said spatial sampling interval.

According to still another aspect of the present invention, there is provided a radiation image acquisition apparatus characterized by comprising a sensor for spatially sampling a radiation transmission distribution of an object to be imaged at a spatial sampling interval and acquiring an image of said object, and a scattered ray removing grid for removing scattered rays from said object, wherein an interval of elements of said scattered ray removing grid is set such that a spatial frequency that is a reciprocal of said interval of elements of said scattered ray removing grid is within $fs(n+\frac{1}{3}) \sim fs(n+0.4)$ or $fs(n+0.6) \sim fs(n+\frac{2}{3})$, where $1/fs$ is said spatial sampling interval and n is an integer not less than 0.

According to still another aspect of the present invention, there is provided a radiation image acquisition method of spatially sampling a radiation transmission distribution of an object to be imaged at a spatial sampling interval and acquiring an image of said object using a sensor and a scattered ray removing grid for removing scattered rays from said object characterized by comprising setting an interval of elements of said scattered ray removing grid such that a spatial frequency that is a reciprocal of said interval of elements of said scattered ray removing grid is within $fs(n+\frac{1}{3}) \sim fs(n+0.4)$ or $fs(n+0.6) \sim fs(n+\frac{2}{3})$, where $1/fs$ is said spatial sampling interval and n is an integer not less than 0.

According to still another aspect of the present invention, there is provided a radiation image acquisition apparatus characterized by comprising an image acquisition unit for spatially sampling a radiation transmission distribution of an object to be imaged through a scattered ray removing grid for removing scattered rays from said object at a spatial sampling interval and acquiring an image of said object, an image processing unit for removing a stripe pattern originating from said scattered ray removing grid from said image by image processing, and a selection unit for allowing selection between removal and nonremoval of said stripe pattern by using said image processing unit, wherein the selection is performed in accordance with an application purpose.

According to still another aspect of the present invention, there is provided a radiation image acquisition apparatus characterized by comprising an image acquisition unit for spatially sampling a radiation transmission distribution of an object to be imaged through a scattered ray removing grid for removing scattered rays from said object at a spatial sampling interval and acquiring an image of said object, an image processing unit for removing a stripe pattern originating from said scattered ray removing grid from said image by image processing, and a selection unit for allowing selection between removal and nonremoval of said stripe pattern by using said image processing unit, wherein the selection is performed in accordance with a portion to be imaged of said object.

According to still another aspect of the present invention, there is provided a radiation image acquisition apparatus characterized by comprising an image acquisition unit for spatially sampling a radiation transmission distribution of an object to be imaged through a scattered ray removing grid for removing scattered rays from said object at a spatial sampling interval and acquiring an image of said object, an image processing unit for removing a stripe pattern originating from said scattered ray removing grid from said image by image processing, and a selection unit for allowing selection between removal and nonremoval of said stripe pattern by using said image processing unit, wherein the selection is performed in accordance with an amplitude of said stripe pattern.

According to still another aspect of the present invention, there is provided a radiation image acquisition apparatus characterized by comprising an image acquisition unit for spatially sampling a radiation transmission distribution on an object to be imaged through a scattered ray removing grid for removing scattered rays from said object at a spatial sampling interval and acquiring an image of said object, an image processing unit for removing a stripe pattern originating from said scattered ray removing grid from said image by image processing, and a selection unit for allowing selection between removal and nonremoval of said stripe pattern by using said image processing unit, wherein the selection is performed in accordance with a magnitude of contrast of said stripe pattern.

According to still another aspect of the present invention, there is provided a radiation image acquisition method characterized by comprising a step of spatially sampling a radiation transmission distribution of an object to be imaged through a scattered ray removing grid for removing scattered rays from said object at a spatial sampling interval and acquiring an image of said object, a step of selecting between removal and nonremoval of a stripe pattern originating from said scattered ray removing grid from said image by image processing, wherein the selection is performed in accordance with an application purpose, and a step of removing said stripe pattern by image processing in accordance with the selection.

According to still another aspect of the present invention, there is provided a radiation image acquisition method characterized by comprising a step of spatially sampling a radiation transmission distribution of an object to be imaged through a scattered ray removing grid for removing scattered rays from said object at a spatial sampling interval and acquiring an image of said object, a step of selecting between removal and nonremoval of a stripe pattern originating from said scattered ray removing grid from said image by image processing, wherein the selection is performed in accordance with a portion to be imaged of said object, and a step of removing said stripe pattern by image processing in accordance with the selection.

According to still another aspect of the present invention, there is provided a radiation image acquisition method characterized by comprising a step of spatially sampling a radiation transmission distribution of an object to be imaged through a scattered ray removing grid for removing scattered rays from said object at a spatial sampling interval and acquiring an image of said object, a step of selecting between removal and nonremoval of a stripe pattern originating from said scattered ray removing grid from said image by image processing, wherein the selection is performed in accordance with an amplitude of said stripe pattern, and a step of removing said stripe pattern by image processing in accordance with the selection.

According to still another aspect of the present invention, there is provided a radiation image acquisition method characterized by comprising a step of spatially sampling a radiation transmission distribution of an object to be imaged through a scattered ray removing grid for removing scattered rays from said object at a spatial sampling interval and acquiring an image of said object, a step of selecting between removal and nonremoval of a stripe pattern originating from said scattered ray removing grid from said image by image processing, wherein the selection is performed in accordance with a magnitude of contrast of said stripe pattern, and a step of removing said stripe pattern by image processing in accordance with the selection.

According to still another aspect of the present invention, there is provided a radiation image processing apparatus for processing an image acquired by spatially sampling a radiation transmission distribution of an object to be imaged through a scattered ray removing grid for removing scattered rays from said object at a spatial sampling interval characterized by comprising an image processing unit for removing a stripe pattern originating from said scattered ray removing grid from said image by image processing, and a selection unit for allowing selection between removal and nonremoval of said stripe pattern by using said image processing unit, wherein the selection is performed in accordance with an application purpose.

According to still another aspect of the present invention, there is provided a radiation image processing apparatus for processing an image acquired by spatially sampling a radiation transmission distribution of an object to be imaged through a scattered ray removing grid for removing scattered rays from said object at a spatial sampling interval characterized by comprising an image processing unit for removing a stripe pattern originating from said scattered ray removing grid from said image by image processing, and a selection unit for allowing selection between removal and nonremoval of said stripe pattern by using said image processing unit, wherein the selection is performed in accordance with a portion to be imaged of said object.

According to still another aspect of the present invention, there is provided a radiation image processing apparatus for processing an image acquired by spatially sampling a radiation transmission distribution of an object to be imaged through a scattered ray removing grid for removing scattered rays from said object at a spatial sampling interval characterized by comprising an image processing unit for removing a stripe pattern originating from said scattered ray removing grid from said image by image processing, and a selection unit for allowing selection between removal and nonremoval of said stripe pattern by using said image processing unit, wherein the selection is performed in accordance with an amplitude of said stripe pattern.

According to still another aspect of the present invention, there is provided a radiation image processing apparatus for processing an image acquired by spatially sampling a radiation transmission distribution of an object to be imaged through a scattered ray removing grid for removing scattered rays from said object at a spatial sampling interval characterized by comprising an image processing unit for removing a stripe pattern originating from said scattered ray removing grid from said image by image processing, and a selection unit for allowing selection between removal and nonremoval of said stripe pattern by using said image processing unit, wherein the selection is performed in accordance with a magnitude of contrast of said stripe pattern.

According to still another aspect of the present invention, there is provided a radiation image processing method of processing an image acquired by spatially sampling a radiation transmission distribution of an object to be imaged through a scattered ray removing grid for removing scattered rays from said object at a spatial sampling interval characterized by comprising a step of selecting between removal and nonremoval of a stripe pattern originating from said scattered ray removing grid from said image by image processing, wherein the selection is performed in accordance with an application purpose, and a step of removing said stripe pattern by image processing in accordance with the selection.

According to still another aspect of the present invention, there is provided a radiation image processing method of processing an image acquired by spatially sampling a radiation transmission distribution of an object to be imaged through a scattered ray removing grid for removing scattered rays from said object at a spatial sampling interval characterized by comprising a step of selecting between removal and nonremoval of a stripe pattern originating from said scattered ray removing grid from said image by image processing, wherein the selection is performed in accordance with a portion to be imaged of said object, and a step of removing said stripe pattern by image processing in accordance with the selection.

According to still another aspect of the present invention, there is provided a radiation image processing method of processing an image acquired by spatially sampling a radiation transmission distribution of an object to be imaged through a scattered ray removing grid for removing scattered rays from said object at a spatial sampling interval characterized by comprising a step of selecting between removal and nonremoval of a stripe pattern originating from said scattered ray removing grid from said image by image processing, wherein the selection is performed in accordance with an amplitude of said stripe pattern, and a step of removing said stripe pattern by image processing in accordance with the selection.

According to still another aspect of the present invention, there is provided a radiation image processing method of processing an image acquired by spatially sampling a radiation transmission distribution of an object to be imaged through a scattered ray removing grid for removing scattered rays from said object at a spatial sampling interval characterized by comprising a step of selecting between removal and nonremoval of a stripe pattern originating from said scattered ray removing grid from said image by image processing, wherein the selection is performed in accordance with a magnitude of contrast of said stripe pattern, and a step of removing said stripe pattern by image processing in accordance with the selection.

According to still another aspect of the present invention, there is provided a design method of designing at least one of a sensor and a scattered ray removing grid used for an apparatus for spatially sampling a radiation transmission distribution of an object to be imaged at a spatial sampling interval and acquiring an image of said object using said sensor and said scattered ray removing grid for removing scattered rays from said object characterized by comprising determining at least one of an interval of elements of said scattered ray removing grid and said spatial sampling interval of said sensor such that a spatial frequency of a stripe pattern, in said image, which originates from said scattered ray removing grid becomes not less than ⅓ and not greater than 40% of a sampling frequency that is a reciprocal of said spatial sampling interval.

According to still another aspect of the present invention, there is provided a design method of designing at least one of a sensor and a scattered ray removing grid used for an apparatus for spatially sampling a radiation transmission distribution of an object to be imaged at a spatial sampling interval and acquiring an image of said object using said sensor and said scattered ray removing grid for removing scattered rays from said object characterized by comprising determining at least one of an interval of elements of said scattered ray removing grid and said spatial sampling interval of said sensor such that a spatial frequency that is a reciprocal of said interval of elements of said scattered ray removing grid is within fs(n+⅓)~fs(n+0.4) or fs(n+0.6)~fs(n+⅔), where 1/fs is said spatial sampling interval and n is an integer not less than 0.

According to still another aspect of the present invention, there is provided a radiographic apparatus characterized by comprising a sensor for spatially sampling a radiation transmission distribution of an object to be imaged at a spatial sampling interval and acquiring an image of said object, and a grid for reducing scattered radiation from said object, wherein a sampling frequency Fs of said sensor as a reciprocal of the spatial sampling interval and a spatial frequency Fg of said grid as a reciprocal of an interval of shades of elements of said grid on an image-receiving surface of said sensor substantially satisfy Fg=j·Fs/3, where j is a positive integer except for multiples of three.

According to still another aspect of the present invention, there is provided a radiographic method of spatially sampling a radiation transmission distribution of an object to be imaged at a spatial sampling interval by using a sensor and a grid for reducing scattered radiation from said object, and acquiring an image of said object characterized by comprising acquiring an image of said object such that a sampling frequency Fs of said sensor as a reciprocal of the spatial sampling interval and a spatial frequency Fg of said grid as a reciprocal of an interval of shades of elements of said grid on an image-receiving surface of said sensor substantially satisfy Fg=j·Fs/3, where j is a positive integer except for multiples of three.

According to still another aspect of the present invention, there is provided a design method of designing at least one of a sensor and a grid used for a radiographic apparatus for spatially sampling a radiation transmission distribution of an object to be imaged at a spatial sampling interval and acquiring an image of said object using said sensor and said grid for reducing scattered rays from said object characterized by comprising determining at least one of the spatial sampling interval of said sensor and an interval of elements of said grid such that a sampling frequency Fs of said sensor as a reciprocal of the spatial sampling interval and a spatial frequency Fg of said grid as a reciprocal of an interval of shades of elements of said grid on an image-receiving surface of said sensor substantially satisfy Fg=j·Fs/3, where j is a positive integer except for multiples of three.

According to still another aspect of the present invention, there is provided a radiation image acquisition apparatus characterized by comprising a sensor for spatially sampling a radiation transmission distribution of an object to be imaged at a spatial sampling interval and acquiring an image of said object, and a scattered ray removing grid for removing scattered rays from said object, wherein an interval of elements of said scattered ray removing grid is set such that a spatial frequency of a stripe pattern, in said image, which originates from said scattered ray removing grid becomes not greater than 40% of a sampling frequency that is a reciprocal of said spatial sampling interval.

According to still another aspect of the present invention, there is provided a radiation image acquisition method of spatially sampling a radiation transmission distribution of an object to be imaged at a spatial sampling interval and acquiring an image of said object using a sensor and a scattered ray removing grid for removing scattered rays from said object characterized by comprising setting an interval of elements of said scattered ray removing grid such that a spatial frequency of a stripe pattern, in said image, which originates from said scattered ray removing grid becomes not greater than 40% of a sampling frequency that is a reciprocal of said spatial sampling interval.

According to still another aspect of the present invention, there is provided a radiation image acquisition apparatus characterized by comprising a sensor for spatially sampling a radiation transmission distribution of an object to be imaged at a spatial sampling interval and acquiring an image of said object, and a scattered ray removing grid for removing scattered rays from said object, wherein an interval of elements of said scattered ray removing grid is set such that a spatial frequency that is a reciprocal of said interval of elements of said scattered ray removing grid is within $fs(n+0.25) \sim fs(n+0.4)$ or $fs(n+0.6) \sim fs(n+0.75)$, where $1/fs$ is said spatial sampling interval and n is an integer not less than 0.

According to still another aspect of the present invention, there is provided a radiation image acquisition apparatus characterized by comprising a sensor for spatially sampling a radiation transmission distribution of an object to be imaged at a spatial sampling interval and acquiring an image of said object, and a scattered ray removing grid for removing scattered rays from said object, wherein an interval of elements of said scattered ray removing grid is set such that a spatial frequency that is a reciprocal of said interval of elements of said scattered ray removing grid is within $fs(n+0.3) \sim fs(n+0.4)$ or $fs(n+0.6) \sim fs(n+0.7)$, where $1/fs$ is said spatial sampling interval and n is an integer not less than 0.

According to still another aspect of the present invention, there is provided a radiation image acquisition method of spatially sampling a radiation transmission distribution of an object to be imaged at a spatial sampling interval and acquiring an image of said object using a sensor and a scattered ray removing grid for removing scattered rays from said object characterized by comprising setting an interval of elements of said scattered ray removing grid such that a spatial frequency that is a reciprocal of said interval of elements of said scattered ray removing grid is within $fs(n+0.25) \sim fs(n+0.4)$ or $fs(n+0.6) \sim fs(n+0.75)$, where $1/fs$ is said spatial sampling interval and n is an integer not less than 0.

According to still another aspect of the present invention, there is provided a radiation image acquisition method of spatially sampling a radiation transmission distribution of an object to be imaged at a spatial sampling interval and acquiring an image of said object using a sensor and a scattered ray removing grid for removing scattered rays from said object characterized by comprising setting an interval of elements of said scattered ray removing grid such that a spatial frequency that is a reciprocal of said interval of elements of said scattered ray removing grid is within $fs(n+0.3) \sim fs(n+0.4)$ or $fs(n+0.6) \sim fs(n+0.7)$, where $1/fs$ is said spatial sampling interval and n is an integer not less than 0.

According to still another aspect of the present invention, there is provided a design method of designing at least one of a sensor and a scattered ray removing grid used for an apparatus for spatially sampling a radiation transmission distribution of an object to be imaged at a spatial sampling interval and acquiring an image of said object using said sensor and said scattered ray removing grid for removing scattered rays from said object characterized by comprising determining at least one of an interval of elements of said scattered ray removing grid and said spatial sampling interval of said sensor such that a spatial frequency of a stripe pattern, in said image, which originates from said scattered ray removing grid becomes not greater than 40% of a sampling frequency that is a reciprocal of said spatial sampling interval.

According to still another aspect of the present invention, there is provided a design method of designing at least one of a sensor and a scattered ray removing grid used for an apparatus for spatially sampling a radiation transmission distribution of an object to be imaged at a spatial sampling interval and acquiring an image of said object using said sensor and said scattered ray removing grid for removing scattered rays from said object characterized by comprising determining at least one of an interval of elements of said scattered ray removing grid and said spatial sampling interval of said sensor such that a spatial frequency that is a reciprocal of said interval of elements of said scattered ray removing grid is within $fs(n+0.25) \sim fs(n+0.4)$ or $fs(n+0.6) \sim fs(n+0.75)$, where $1/fs$ is said spatial sampling interval and n is an integer not less than 0.

According to still another aspect of the present invention, there is provided a design method of designing at least one of a sensor and a scattered ray removing grid used for an apparatus for spatially sampling a radiation transmission distribution of an object to be imaged at a spatial sampling interval and acquiring an image of said object using said sensor and said scattered ray removing grid for removing scattered rays from said object characterized by comprising determining at least one of an interval of elements of said scattered ray removing grid and said spatial sampling interval of said sensor such that a spatial frequency that is a reciprocal of said interval of elements of said scattered ray removing grid is within $fs(n+0.3) \sim fs(n+0.4)$ or $fs(n+0.6) \sim fs(n+0.7)$, where $1/fs$ is said spatial sampling interval and n is an integer not less than 0.

Other objects and advantages besides those discussed above shall be apparent to those skilled in the art from the description of a preferred embodiment of the invention which follows. In the description, reference is made to accompanying drawings, which form a part thereof, and which illustrate an example of the invention. Such example, however, is not exhaustive of the various embodiments of the invention, and therefore reference is made to the claims which follow the description for determining the scope of the invention.

BRIEF DESCRIPTION OF THE DRAWINGS

FIG. 3 is a flow chart for the implementation of the first embodiment by software;

FIG. 4 is a block diagram for explaining the second embodiment of the present invention;

FIG. 5 is a block diagram for explaining the third embodiment of the present invention;

FIG. 13 is a graph showing the MTF of the flat panel sensor, the spectrum of a grid stripe pattern, and the like;

FIG. 15 is a graph for explaining sampling of the spectra of the harmonic components of a grid stripe pattern.

DETAILED DESCRIPTION OF THE PREFERRED EMBODIMENTS

The embodiments of the present invention will be described below with reference to the accompanying drawings.

(First Embodiment)

In an image acquisition apparatus according to the first embodiment of the present invention, when an acquired image is to be reproduced, the problem in the prior art is solved by setting the intervals of grid lead members such that even if a grid image exists and interferes with an image component to a certain degree, the produced stripes have a frequency which hardly makes an observer have a sense of incongruity.

This embodiment will be described below. In digital images obtained by sampling, image artifacts produced by the grid are classified into the following two categories:

(A) grid images having low spatial frequencies; and
(B) beat images obtained by sampling grid images having low spatial frequencies.

Figure 7:
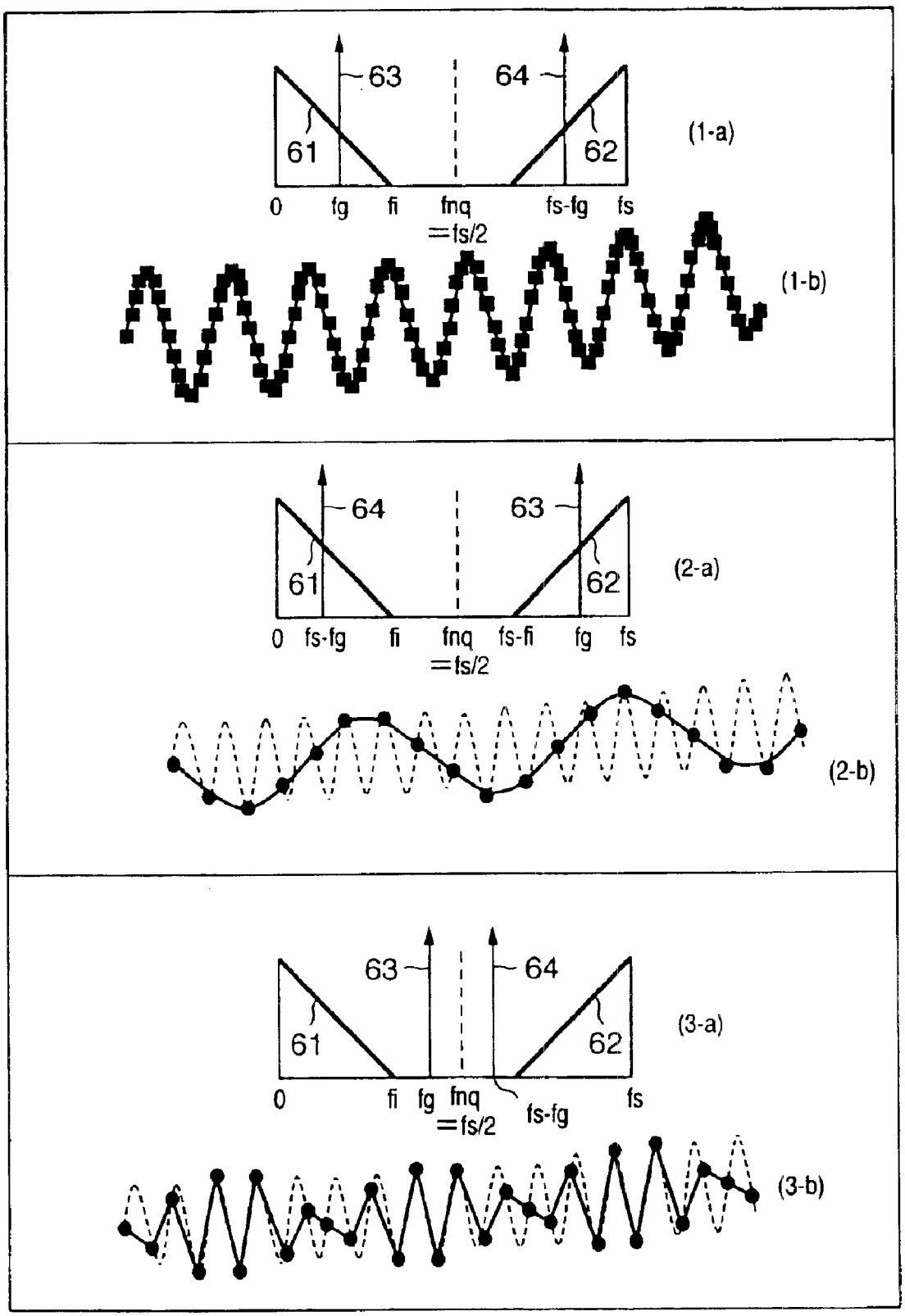
FIGS. 7(1-*a*) to 7(3-*b*) are graphs for explaining artifacts originating from a grid stripe pattern.

FIGS. 7(1-a) to 7(3-b) schematically show the states of artifacts to explain artifacts belonging to categories (A) and (B). For the sake of descriptive convenience, consider only a fundamental wavelength, assuming that the second- and higher-order harmonics of a grid stripe pattern are not resolved.

FIG. 7(1-a) shows the state of an artifact belonging to category (A) in the frequency domain (only the positive region). Reference numeral 61 denotes an image component region, which exhibits a substantially maximum frequency fi; and 62, an image harmonic component mathematically produced by sampling. In this case, a sampling frequency is represented by fs, and Nyquist frequency fnq=fs/2. A line spectrum 63 is a grid stripe pattern component having a frequency fg. As shown in FIG. 7(1-a), since this component overlaps the image component 61 to impair the image quality, and has a low frequency, the observer experiences a sense of incongruity from the stripe pattern.

FIG. 7(1-b) one-dimensionally shows how sampling is performed. In FIG. (1-b), "●" (bullet) indicates a sampling point.

It is obvious from the above description that the frequency fg of the grid stripe pattern and the frequency fi (fi<fs/2) of the image must satisfy:

$$fg > fi \quad (1)$$

FIG. 7(2-a) shows the state of another artifact belonging to category (A) in the frequency domain (only in the positive region). A region 61 is an image component region and exhibits the maximum frequency fi. Since the frequency fg of the grid is higher than the Nyquist frequency fnq that is ½ the sampling frequency fs, a frequency component 64 of fs−fg, which is aliasing, appears. In the case shown in FIG. 7(2-a), the frequency component 64 as aliasing overlaps the image component 61 and impairs the image quality, and hence a stripe pattern gives the observer a sense of incongruity. FIG. 7(2-b) one-dimensionally shows how sampling is performed. In FIG. (2-b), "●" (bullet) indicates a sampling point, and the dashed line indicates a signal form before sampling. That is, to prevent impairment of the image component, the frequency fg of the grid stripe pattern and the frequency fi (fi<fs/2) of the image must satisfy:

$$fs - fg > fi \quad (2)$$

According to inequalities (1) and (2), the frequency fg of the grid stripe pattern must satisfy the following inequality, in relation to the maximum frequency fi of the image and the sampling frequency fs:

$$fi < fg < fs - fi \quad (fi < fs/2) \quad (3)$$

In this case as well, an artifact belonging to category (B) may be produced.

FIG. 7(3-a) shows a state of an artifact when the grid stripe pattern frequency is set in the spatial frequency region which satisfies inequality (3). FIG. 7(3-b) one-dimensionally shows how sampling is performed. In FIG. (3-b), "●" (bullet) indicates a sampling point, and the dashed line indicates a signal form before sampling.

Referring to FIG. 7(3-a), it seems that since an image frequency component 61 does not overlap a grid image component 63, the image is not impaired, and the observer has no sense of incongruity. If, however, beat noise-like amplitude variation component overlaps a frequency component of image information as shown in FIG. 7(3-b), the observer of the image recognizes this overlap as an artifact, and a stripe pattern gives the observer a sense of incongruity. The frequency of this amplitude variation is given by |fs/2−fg|. When some nonlinear conversion is performed for the image, this variation component may actually become an artifact that impairs the image. If, for example, the frequency of a grid stripe pattern on an image is set in a frequency region where beat-like artifacts (moire) occur (i.e., a high-frequency region), the grid stripe pattern and beat-like artifacts may be removed by filtering without damaging the image information (e.g., filtering to remove only components near the spatial frequency of the grid stripe pattern). If, however, nonlinear element conversion (e.g., logarithmic conversion) is performed for a low-frequency beat-like artifact, the artifact becomes a signal component having an actual spectrum. In this case, this artifact cannot be removed by the above filtering technique. A beat-like artifact is repetitions of high-amplitude and low-(or zero-)amplitude portions of a stripe pattern. Since a high-amplitude portion inevitably differs in noise characteristics from a low-amplitude portion, even if stripe components are removed, variations in noise characteristics remain. As described above, even if the frequency of a grid stripe pattern on an image is set in a frequency region where beat-like artifacts occur, and the grid stripe pattern is removed by filtering, some kind of mark of a beat-like artifact may remain. Therefore, the beat-like artifact itself (the occurrence or magnitude of the beat-like artifact) should be suppressed.

Ideally, all artifact frequencies should fall outside the frequency fi of the image. In this case, no problem arises.

Although the frequency fi is the maximum frequency of the image, this frequency may be regarded as a frequency that gives the observer no sense of incongruity when the image is reproduced (hard copy, monitor display, or the like). Both inequality (3) and |fs/2−fg|>fi must be satisfied at once. Assuming that fg is set at a position corresponding to fs>fg>fs/2, the following inequality is established:

$$fi+fs/2<fg<fs-fi \qquad (4)$$

To satisfy this inequality, fi<fs/4 must also be satisfied, which is a strict condition. If fi<fs/4 is not satisfied in inequality (4), there is no overlap between the ranges defined by the left- and right-side signs. That is, an ideal condition for eliminating the influences of the grid is that the frequency band of the image is equal to or less than ½ the Nyquist frequency, and the frequency of the grid stripe pattern is near ½ the Nyquist frequency. This condition means that if an image to be acquired is determined, the sampling frequency must be set to at least four times higher than the maximum spatial frequency of the image to be acquired.

No consideration, however, is given to the power of beat noise-like variation component. The present inventor has contrived and proven that the condition given by inequality (4) can be moderated, on the basis of the result obtained by comparing the power of the beat noise-like variation component with the power of the grid stripe pattern and the result obtained by observing the image actually formed by using the grid.

As the frequency of the stripe pattern separates farther from the Nyquist frequency, the amplitude variation as beat noise increases in frequency. As a consequence, this component cannot be observed. Consider how much this stripe pattern frequency differs from the Nyquist frequency when it becomes difficult for the observer to observe the variation component.

Line spectra always exist at positions which have a mirror-image relationship centering on the Nyquist frequency whenever sampling is performed, and beat noise is always produced between them. In the cases shown in FIGS. 7(1-b) and 7(2-b), although beat noise is produced, it does not exist apparently. One conceivable reason for this is attributed to frequency; in the case shown in FIG. 7(2-a) or 7(3-a), the distance (frequency) between the two spectra having a mirror-image relationship centering on the Nyquist frequency is large, and hence the beat noise frequency becomes high. At this time, the spectrum of the fundamental sine wave exists sufficiently below the Nyquist frequency, and they greatly differ in frequency and power. For this reason, only the fundamental sine wave having stronger power is strongly recognized by the observer.

Figure 8A:
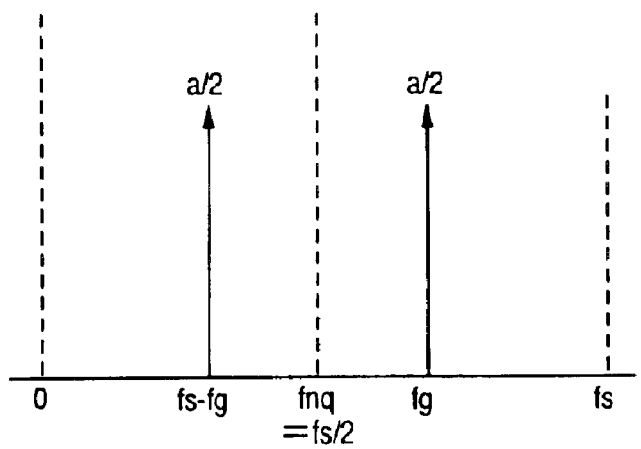
FIGS. 8A and 8B are graphs for explaining beat noise produced when a grid stripe pattern is sampled.

The manner in which beat noise is produced is mathematically expressed. Consider a case wherein a sine wave having the spatial frequency fg is sampled at the sampling frequency fs. Assume that fg>fs/2 is set in consideration of the grid actually used. This is not a necessary condition. In this case, as shown in FIG. 8A, a line spectrum pair corresponding to the frequency of the sine wave is produced. Let a/2 be the peak of each line spectrum, and a×cos(2πfgx) be the initial grid image. When a cosine wave having the frequency fg is sampled at the frequency fs, two cosine waves appear below fs.

$$g(x)=a\{\cos(2\pi fgx)+\cos(2\pi(fs-fg)x)\}=2a\times\cos(2\pi(fg-fs/2)x)\times \cos(2\pi sx/2) \qquad (5)$$

Equation (5) represents beat noise, which is equivalent to the amplitude modulated by a sine wave having a frequency corresponding to the difference between the two sine waves. As (fg/2−fs) becomes a small value other than 0, an unstable amplitude variation (beat) with a low frequency occurs.

According to the Shannon's sampling theorem, data sampled at a frequency equal to or lower than the Nyquist frequency can be completely reconstructed by using an ideal filtering means (a filter that passes signals having frequencies equal to or lower than the Nyquist frequency), and no beat is produced by the line spectrum pair. It is likely that the observer strongly recognizes the beat noise in the case shown in FIG. 7(3-b) because of the filtering means.

In general, a sampled signal is reconstructed by connecting the sampling points with a straight line or the like. This means differs from an ideal filtering means according to the sampling theorem.

A person with normal visual perception or display apparatus interpolates by connecting neighboring points with a straight line without using any ideal filter (convolution using a sinc function as a kernel) as in the sampling theorem. The same applies to a case wherein a signal is observed as an image. That is, such a difference between normal visual perception and the sampling theorem appears as beat noise.

Figure 8B:
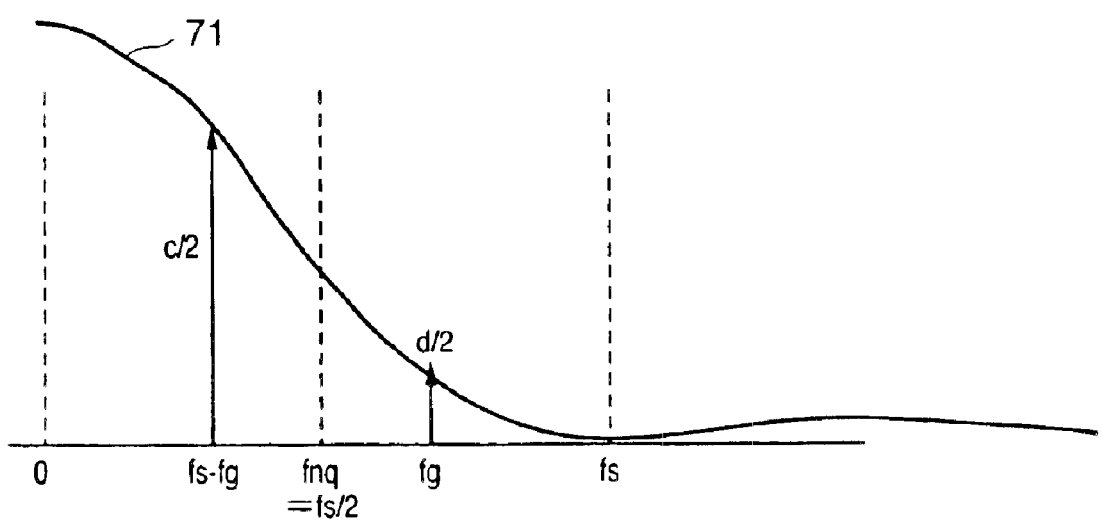

Interpolating with a straight line amounts to filtering with a characteristic like a characteristic curve 71 in FIG. 8B.

According to the characteristic curve 71 in FIG. 8B, a form s(f) of the filter is given by $$s(f)=\sin^2(\pi f/fs)/(\pi f/fs)^2 \qquad (6)$$

Let c/2 and d/2 be the heights of a line spectrum pair at mirror-image positions after filtering.

The sum of sine waves at this time is expressed like equation (5):

$$g(x)=d\times\cos(2\pi fgx)+c\times\cos(2\pi(fs-fg)x)=2d\times\cos(2\pi(fg/2-fs)x)\times \cos(2\pi fsx/2)+(c-d)\times\cos(2\pi(fs-fg)x) \qquad (7)$$

The first term of equation (7) represents beat component; and the second term, a general sine wave component.

According to equation (5), we have $$c/2=(a/2)\frac{\sin^2\left(\pi\frac{fs-fg}{fs}\right)}{\left(\pi\frac{fs-fg}{fs}\right)^2}, \qquad (8)$$

$$d/2=(a/2)\frac{\sin^2\left(\pi\frac{fg}{fs}\right)}{\left(\pi\frac{fg}{fs}\right)^2} \qquad (fg>fs)$$

If in equation (7) the power of the second term which represents the normal sine wave component exceeds the power of the first term which represents the beat component, it may become difficult for the observer to recognize the beat component.

If the ratio of the power of the first term to that of the second term in equation (7) is calculated on the basis of the above assumption, then $$(c-d)^2/2d^2>1$$

(condition under which the power of the second terminal exceeds that of the first term)

This inequality can be rewritten into $$c/d>2^{1/2}+1$$

A substitution of this into equation (7) yields $$\frac{\sin^2\left(\pi\frac{fs-fg}{fs}\right)}{\left(\pi\frac{fs-fg}{fs}\right)^2} \Big/ \frac{\sin^2\left(\pi\frac{fg}{fs}\right)}{\left(\pi\frac{fg}{fs}\right)^2} > \sqrt{2}+1, \qquad (9)$$

$$\frac{fg}{fs-fg} > \sqrt{\sqrt{2}+1}, \quad fg > \frac{fs}{\frac{1}{\sqrt{\sqrt{2}+1}}+1}$$

$$fg > 0.608\, fs$$

It is obvious from inequality (9) that if the frequency of a sine wave to be sampled is higher than 60.8% of a sampling frequency (aliasing occurs), sampling can be performed with little observable beat noise. In this case, grid stripe pattern information appears as a component equal to or less than 80% of the Nyquist frequency (fs/2). This component is equivalent to a component equal to or less than 40% of the sampling frequency. If, therefore, the grid stripe pattern has a frequency equal to or less than 80% of the Nyquist frequency, a stable stripe pattern can be observed without any conspicuous beat upon sampling.

The above consideration defines the upper limit spatial frequency of a stripe pattern (grid stripe pattern) appearing below the Nyquist frequency due to the grid. More specifically, the frequency of the grid stripe pattern is set to be equal to or less than 80% (equal to or less than 40% of the sampling frequency) of the Nyquist frequency. In practice, however, this frequency has its own lower limit. Since an artifact originating from the stripe pattern itself, i.e., stripe pattern information, is not allowed to overlap an image component, the maximum frequency of the image component needs to be lower than the lower limit frequency of the grid stripe pattern.

In general, the maximum frequency component of a signal representing an image cannot be accurately defined. Examples of evaluation criteria for images will be listed below:

A frequency that meets the approval of the observer when an acquired image is reproduced by a display apparatus or recording apparatus.

When a maximum frequency is assumed, the sampling pitch is determined by regarding 1.5 to 2 times the assumed frequency as a maximum frequency (see Nakamizo et al., "Counting/Measurement" (Baihukan)).

The latter condition is widely used, in particular, and the sampling pitch is often set such that a spatial frequency required generally is equal to or less than 60% of the Nyquist frequency (equal to or less than 30% of the sampling frequency). That is, the sampling pitch is set such that grid stripe pattern information appears at a frequency equal to or higher than the sampling frequency.

Note that the lower limit of grid stripe frequencies is 25% the sampling frequency with reference to "2 times" of "1.5 to 2 times" described above and ⅓ the sampling frequency with reference to "1.5 times" thereof. Therefore, the lower limit of grid stripe frequencies may be set to at least 25% of the sampling frequency, preferably 30% thereof, more preferably ⅓ thereof.

Assume that the sampling pitch is 0.1 mm (fs=10 cyc/mm). In this case, the Nyquist frequency is 5 cyc/mm. According to the above general condition, the frequency of an image component which is generally used is equal to or less than 30% of the sampling frequency, i.e., 3 cyc/mm. That is, the lower limit frequency of stripe pattern information is 3 cyc/mm, and the upper limit frequency is 40% of the sampling frequency, i.e., 4 cyc/mm. If, therefore, the frequency of a grid stripe pattern is set within the range of 3 to 4 cyc/mm, no conspicuous beat appears in a grid stripe pattern and interferes with observation.

Figure 9:
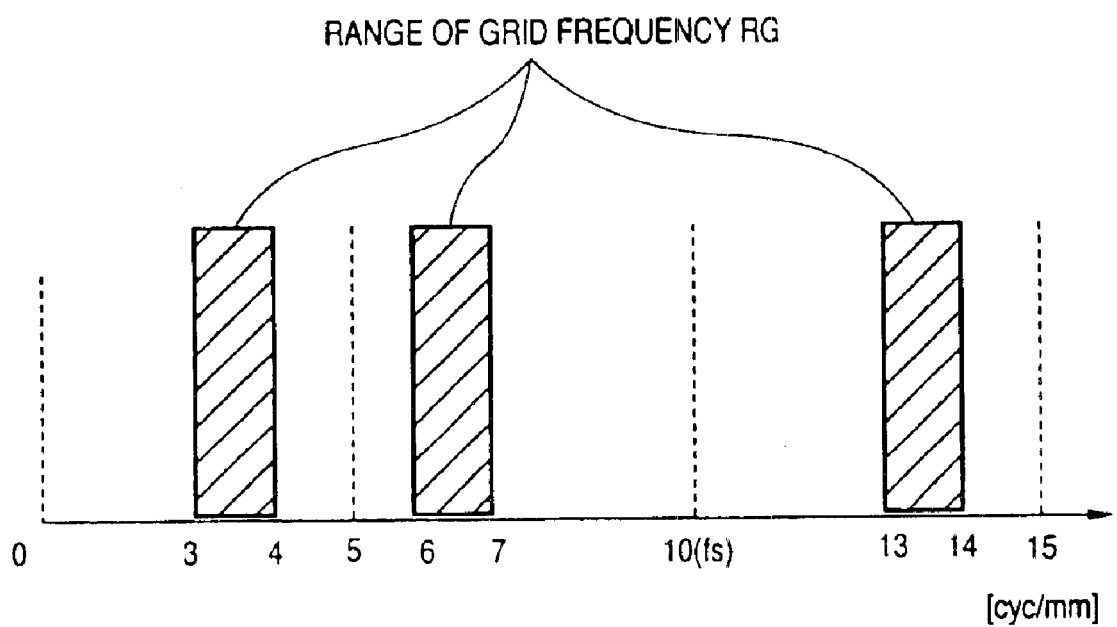
FIG. 9 is a graph showing an example of the spatial frequency range of a grid body.
Figure 10:
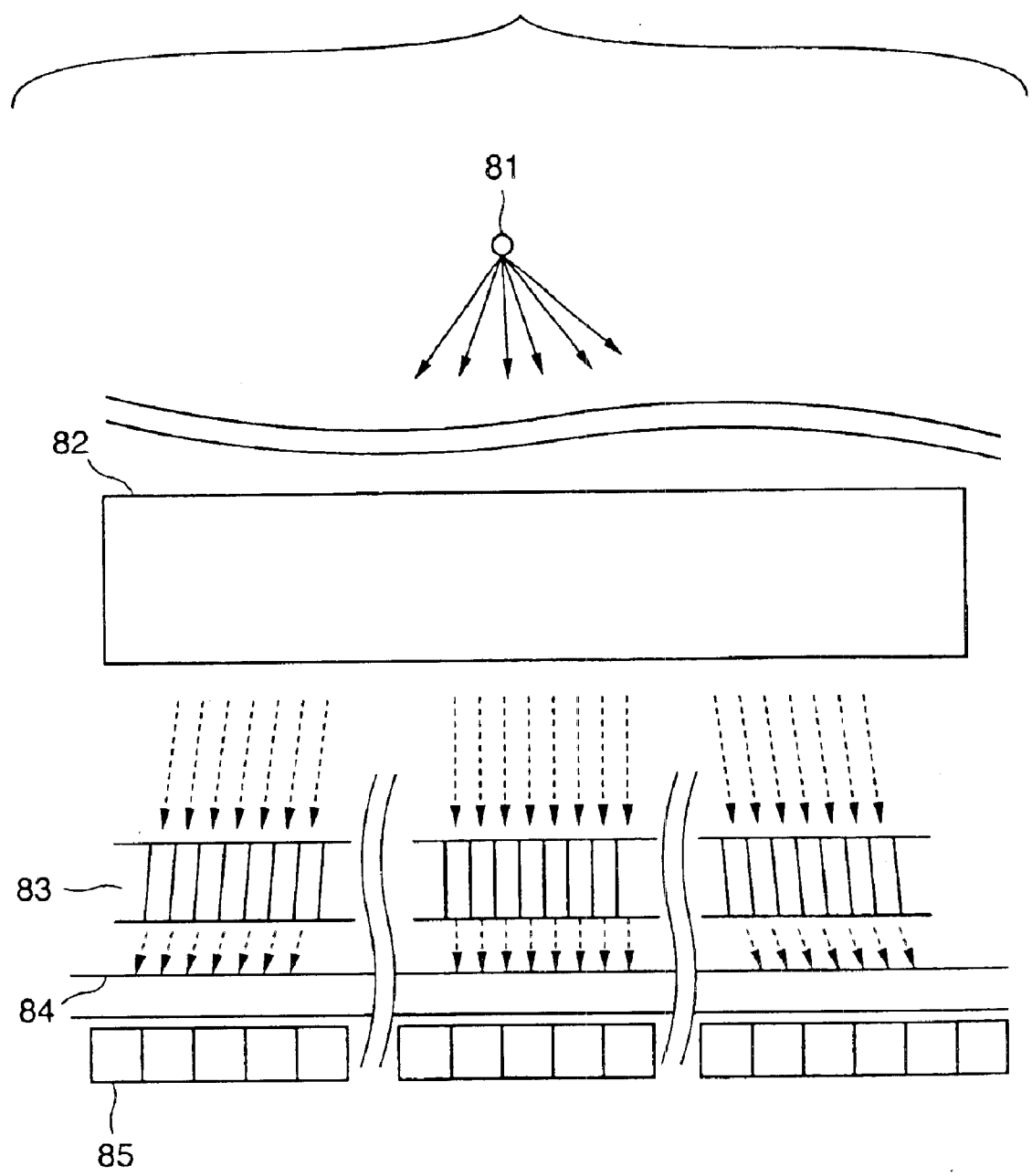
FIG. 10 is a view for explaining a scattered ray removing grid.

The above condition is set to determine the frequency of a grid stripe pattern, and the frequency of the lead members of the grid body whose stripe pattern corresponds to this value changes after sampling. In this case, as shown in FIG. 9 a frequency range RG [cyc/mm] of the grid body is given by $$5(2n+1)-2\sim 5(2n+1)-1 \text{ or } 5(2n+1)+1\sim(2n+1)+2;\ n=0, 1, 2,$$

(see FIG. 9)
where n is an integer equal to or more than 0.

This mathematical expression represents a value calculated when the sampling pitch is 0.1 mm (fs=10 cyc/mm). In general, if the sampling frequency fs [cyc/mm] is (sampling pitch 1/fs [mm]), the frequency range of the grid body is given by $$fs(n+0.3)\sim fs(n+0.4)$$

or $$fs(n+0.6)\sim fs(n+0.8)\ [\text{cyc/mm}]$$

The frequency of the grid body (the number of grid elements) is determined within the above range in consideration of scattered ray removing performance as the primary object of the grid, the resolution of a flat panel sensor, and the like. In general, in consideration of the resolution of the sensor, a grid stripe pattern frequency of 6 to 7 cyc/mm can be selected, at which the second-order harmonic is difficult to resolve and the scattered ray removing ratio is high.

In this embodiment, the frequency of the grid to be used is selected by the above calculation such that the observer can be satisfied to some degree without removing any grid stripe pattern information owing to some experience or depending on an application purpose, thus overcoming the problem.

As the spatial frequency of the grid stripe pattern is fixed, the grid stripe pattern information can be removed to some extent by filtering. In removing the grid stripe pattern information by setting a grid stripe pattern frequency in the above manner, even if the pattern information cannot be completely removed, reducing the intensity of the grid stripe pattern will minimize the influence on the observer.

Figure 1:
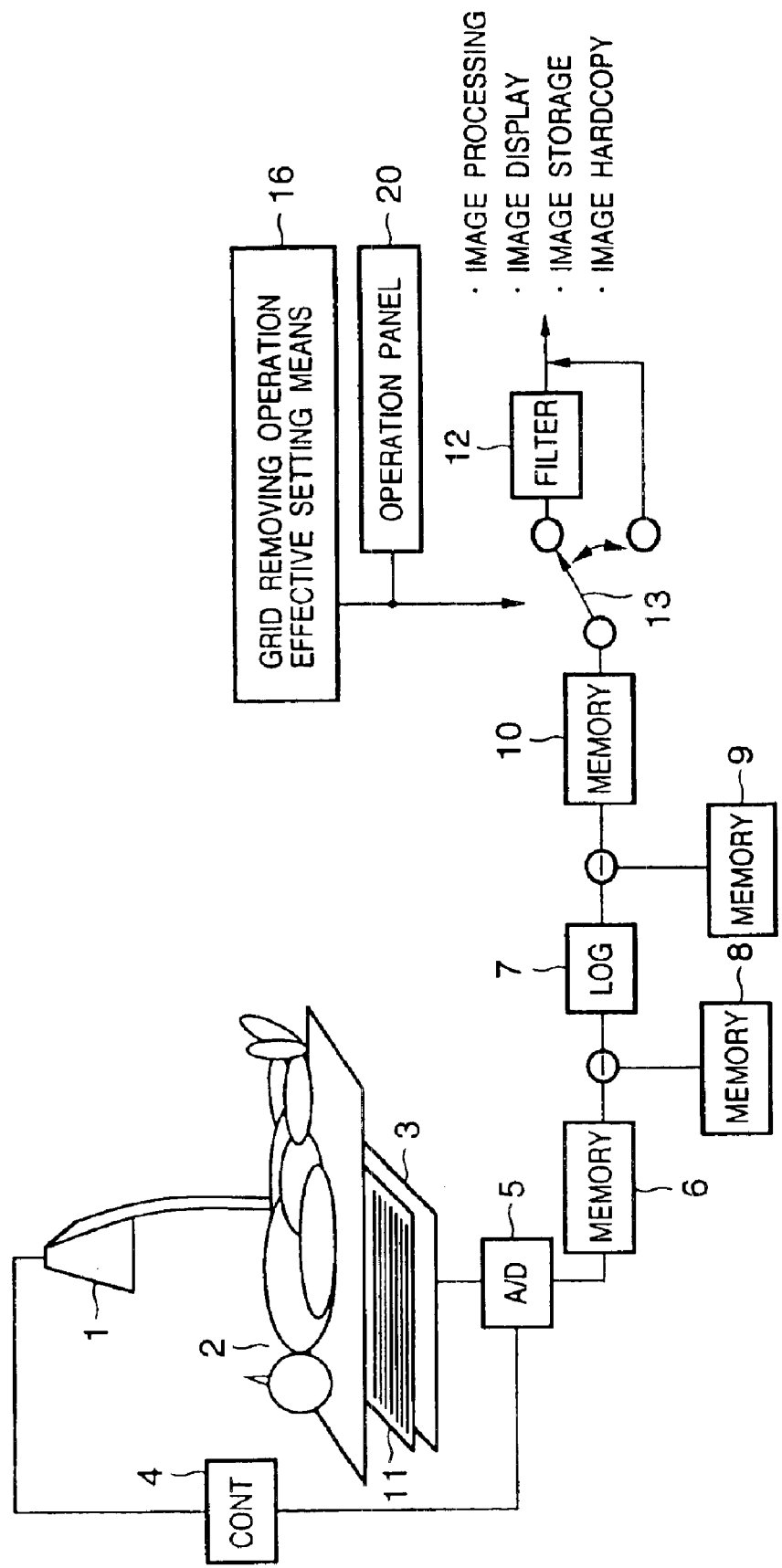
FIG. 1 is a block diagram for explaining the first embodiment of the present invention.

FIG. 1 is a schematic view of the first embodiment. FIG. 1 shows a system for imaging the human body lying on a table. Reference numeral 1 denotes an X-ray tube; 2, a human body as an object to be imaged; 11, a grid for removing scattered X-rays, which is a detachable grid for removing scattered X-rays from the object 2; 3, an X-ray sensor panel for converting an X-ray intensity distribution (X-ray transmission distribution) into a charge distribution, two-dimensionally sampling the distribution at desired intervals, and sequentially outputting the sampled data; 5, an analog/digital converter; 4, a controller for controlling the X-ray radiation timing and image acquisition timing; and 6, a memory for temporarily storing an image. The X-ray sensor panel 3 varies in offset and gain for each pixel. To correct this variation, an offset value as an image acquired without any radiation of X-rays is stored in a memory 8, whereas data obtained by logarithmically converting a gain value acquired without the object 2 and grid 11 is stored in a memory 9. Reference numeral 7 denotes a conversion unit for logarithmic conversion, and more specifically, a lookup table. An acquired image of the human body is logarithmically converted after the offset value in the memory 8 is subtracted (removed) from the image. The difference between the resultant value and the gain value in the memory 9 is calculated (division) to obtain an X-ray intensity distribution image having undergone correction of a variation in gain value. This image is temporarily stored in a memory 10. Thereafter, the stored image is extracted and subjected to image storage, image processing, image display, and hardcopy operation, and the like to be used for diagnosis and the like.

A block 12 is an image processing means (filtering means) for removing grid stripe pattern information by image processing (filtering). The image processing means 12 removes a grid stripe pattern component by spatial filtering using the image stored in the memory 10. A mechanism 13 is a selection means (switch) that is operated by the operator to choose between using the filtering means 12 or not using it in accordance with an output from an external output from a grid removing operation effective setting means (mechanism) 16 or operation panel 20. The flow of a signal can be changed to skip the operation of the block 12 in accordance with the selection made through the selection means 13.

In this case, the X-ray sensor panel 3 has a plurality of pixels distributed vertically and horizontally at a pitch of 0.1 mm in a two-dimensional space. With this structure, two-dimensional, discrete sampling is performed. As described in relation to the setting of the above grid stripe pattern frequency, the grid stripe pattern frequency (the number of grid elements) of the grid 11 is set to 6 to 7 cyc/mm, and hence the observer can observe an image without a sense of incongruity even if the grid stripe pattern information is not removed by filtering.

Figure 2A:
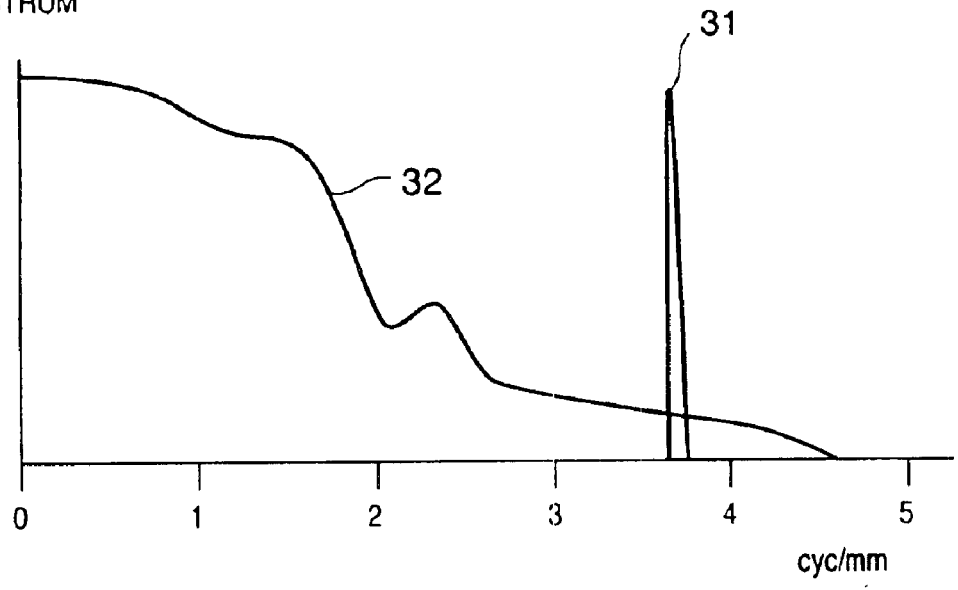
FIGS. 2A and 2B are graphs for explaining spatial spectra in an image.

FIG. 2A schematically shows the state of a one-dimensional amplitude spectrum in a direction perpendicular to the grid stripe pattern of the image stored in the memory 10. Referring to FIG. 2A, reference numeral 32 denotes a spectrum of an image component; and 31, a spectrum of a grid stripe pattern component, which exhibits a substantial spectrum form with noise being neglected. Even if the grid stripe pattern component 31 exists, the observer observes only this stable frequency component, and there is no component associated with beat noise. Therefore, as the observer becomes accustomed to the stripe pattern or recognizes it, the existence of the stripe pattern does not relatively interfere with the observation.

If, however, the operator or observer wants to remove the grid stripe pattern information from this image owing to subsequent image processing or the image reproducing mechanism, he/she selects grid removing operation through the operation panel 20.

Figure 2B:
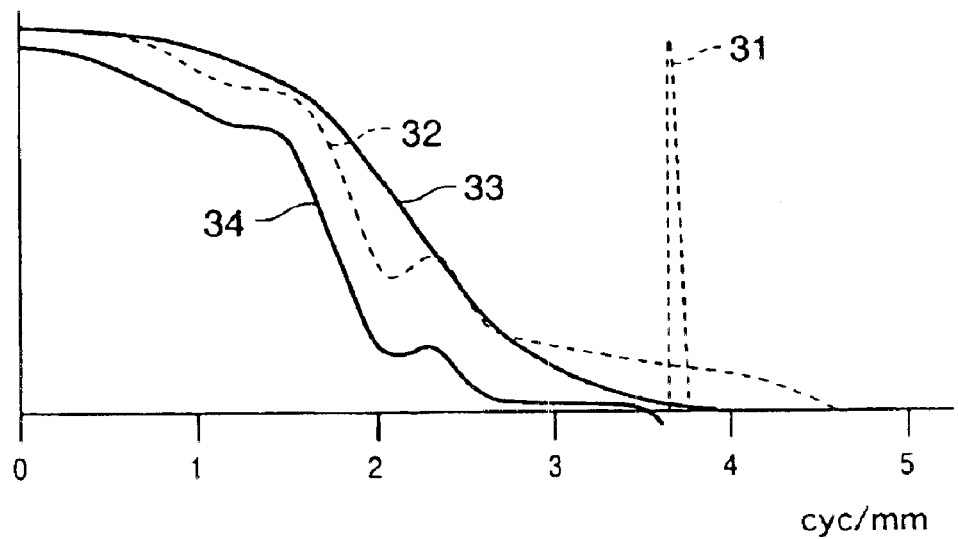

FIG. 2B schematically shows the state of a spectrum upon execution of grid removing filtering. Reference numeral 33 denotes an example of a filter characteristic; and 34, an image spectrum after filtering. To stabilize spatial characteristics, the filter cannot have a steep characteristic. If, therefore, the grid stripe pattern component 31 is removed, part of an image component inevitably deteriorates in response characteristic. In consideration of this, the operator chooses between removal and nonremoval of the grid. In this embodiment, when the acquired image exhibits the gain value stored in the memory 9, no problem arises if the image is acquired without removing the grid 11 because the frequency of the grid is constant.

FIG. 3 is a flow chart for the implementation of this embodiment by means of software. Referring to FIG. 3, a process block (step) is divided into operations in blocks C1 to C11. The operation in block C1 is executed to acquire an image of a gain value. An image A is obtained by radiating X-rays without any object. In block C2, this image is logarithmically converted into an image B. In block C3, an offset value is obtained; an image C is obtained without radiating any X-rays. In block C4, an image of the object is actually acquired; the grid is installed, and an image D is obtained by irradiating the object with X-rays. In block C5, the image C is subtracted from the image D to obtain an image E having undergone offset correction. In block C6, the image E is logarithmically converted into an image F. In block C7, the image B is subtracted from the image F to obtain an object image G having undergone gain correction. In block C8, the flow branches depending on whether a stripe pattern operating from grid will be removed in accordance with operation (instruction) of the operation panel 20 by the operator. In block C9, since the instruction to remove the grid is received, filtering, i.e., grid removing operation, is performed for the image G to obtain an object image H from which grid stripe pattern information is removed. In block C10, the object image H is output. If no grid removing instruction is received, the object image G is output without any processing in block C11.

In this embodiment, as the memory means 10 in FIG. 1, a nonvolatile storage medium such as a magnetic disk may be used to always store image data including grid stripe pattern information to allow the operator to select an image without any grid stripe pattern information or an image with grid stripe pattern information or output them at once. Furthermore, this embodiment can be practiced with an arrangement including only an image storage system without any image acquisition system.

(Second Embodiment)

FIG. 4 is a block diagram showing the second embodiment, in which the frequency of a grid stripe pattern, the sampling pitch of an X-ray sensor panel, and the like are set in the same manner as in FIG. 1. In the structure shown in FIG. 4, an application purpose table 14 is prepared. After an image is acquired, the operator selects an application purpose through an application purpose setting means 17 with respect to the image stored in a memory 10 or magnetic disk. As a consequence, whether to remove the grid or not is automatically selected. If a switch 13 selects the A side, the image in the memory 10 is filtered by a filtering unit 12 and output. If the switch 13 selects the B side, the image in the memory 10 is output without being filtered.

As described in relation to the setting of the above grid stripe pattern frequency, the grid stripe pattern frequency (the number of grid elements) of a grid 11 is set to 6 to 7 cyc/mm, and hence the observer can observe an image without a sense of incongruity even if the grid stripe pattern information is not removed by filtering.

With this table 14, for example, in emphasizing a high spatial frequency as in spatial frequency emphasis processing, since a grid image becomes a hindrance, it is removed (the switch 13 is set on the A side). In displaying an image or performing hardcopy operation on a larger scale, i.e., 100% or more, the switch 13 is set on the B side to inhibit removal of a grid image so as to minimize an image blur. In displaying an image or performing hardcopy operation upon reduction, the switch 13 is set on the A side to remove a grid image. If an image is to be stored in another storage means, since removal processing can be performed for the stored image, the switch 13 is set on the B side to inhibit removal of a grid image, thus increasing the information amount.

(Third Embodiment)

FIG. 5 is a block diagram showing the third embodiment, in which the frequency of a grid stripe pattern, the sampling pitch of an X-ray sensor panel, and the like are set in the same manner as in FIG. 1. In the structure shown in FIG. 5, an imaging position table 18 is prepared. When the operator selects an application purpose through an imaging position setting means 19 with respect to the image stored in a memory 10 or magnetic dick upon imaging operation, whether to perform grid removing operation or not is automatically selected.

As described in relation to the setting of the above grid stripe pattern frequency, the grid stripe pattern frequency (the number of grid elements) of a grid 11 is set to 6 to 7 cyc/mm, and hence the observer can observe an image without a sense of incongruity even if the grid stripe pattern information is not removed by filtering.

With this table 18, when the observer is to observe an image of a bone portion such as the pelvis or joint, which requires a high spatial frequency for the image, a switch 13 is set on the B side to allow the observer to observe the image without any blur without removing a grid image. When the observer is to observe a chest portion (front chest portion), abdomen, or the like for which a high spatial frequency is not required, and a halftone image needs to be easily observed, the switch 13 is set on the A side to allow the observer to observe the image without any grid image.

(Fourth Embodiment)

Although the grid frequency is so set that a grid image does not relatively interfere with observation, if the contrast of the grid image is strong, it still interferes with the observer. The contrast of a grid image varies depending on the conditions (e.g., energy) of X-rays to be used. In some case, an object is imaged without any grid.

To determine this, the spectrum of a given portion of an acquired image in a direction perpendicular to the grid is calculated, and whether to perform grid removing operation or not is selected depending on the peak value of the grid component (directly corresponding to the contrast value if it is a logarithmic image).

Figure 6:
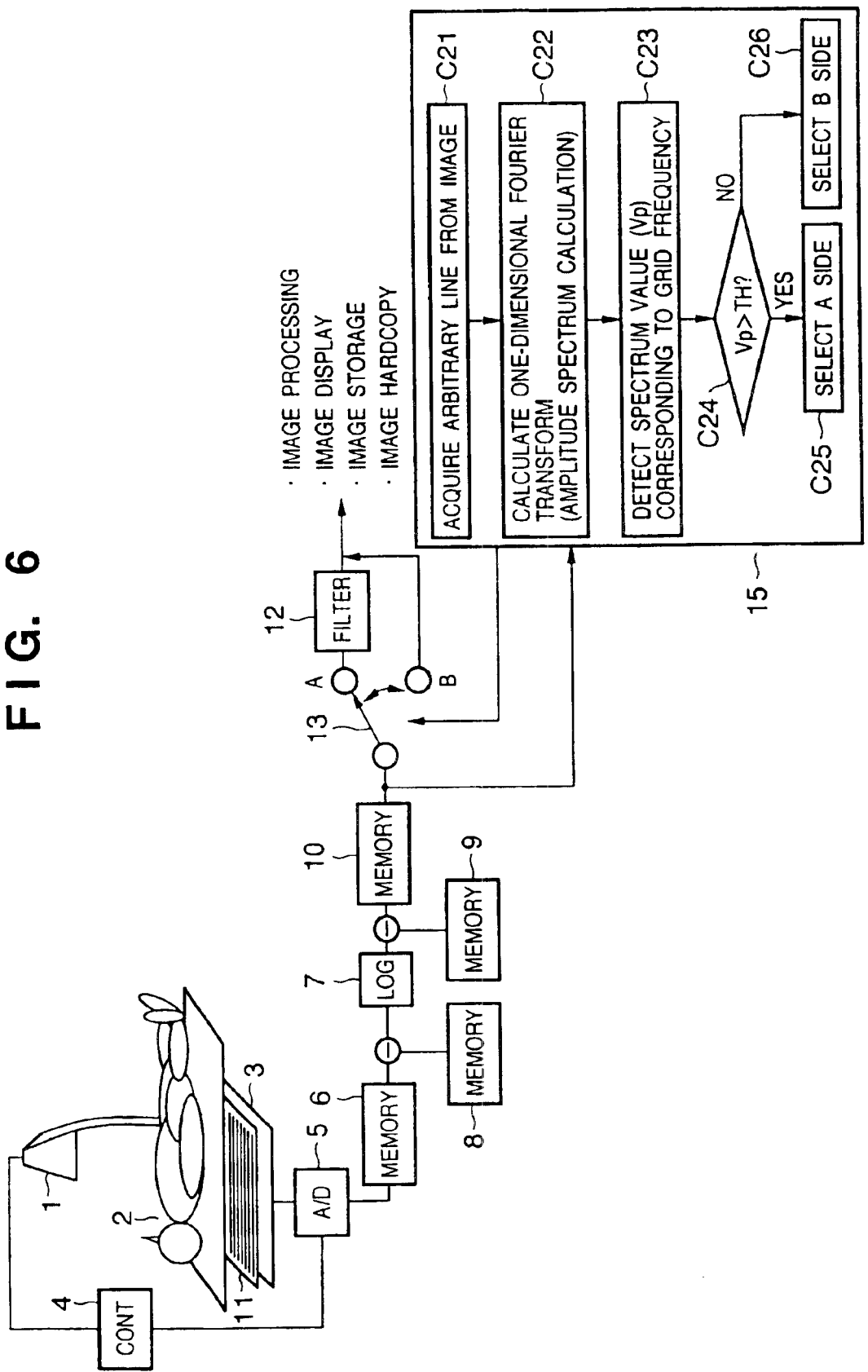
FIG. 6 is a block diagram for explaining the fourth embodiment of the present invention.

FIG. 6 is a block diagram showing the fourth embodiment, in which the frequency of a grid stripe pattern, the sampling pitch of an X-ray sensor panel, and the like are set in the same manner as in FIG. 1. As described in relation to the setting of the above grid stripe pattern frequency, the grid stripe pattern frequency (the number of grid elements) of a grid 11 is set to 6 to 7 cyc/mm, and hence the observer can observe an image without a sense of incongruity even if the grid stripe pattern information is not removed by filtering.

A block 15 in FIG. 6 includes software; a flow chart is shown in the block. In block C21 in the flow chart, an arbitrary line is acquired from an image from a memory 10. In block C22, one-dimensional Fourier transformation is performed for this image to calculate an amplitude spectrum. In block C23, an amplitude value (spectrum value) Vp corresponding to the grid frequency is measured from the amplitude spectrum value. In block C24, the amplitude value Vp is compared with a threshold TH set in advance. If Vp is larger than TH, the corresponding grid image must be removed. To remove the grid image, therefore, a switch 13 is set on the A side in block C25. If Vp is not larger than TH, the switch 13 is set on the B side in block C26.

Note that the switch 13 may be selectively operated in accordance with the magnitude of contrast of a grid stripe pattern existing at the grid frequency. If the contrast is higher than a predetermined threshold, the switch 13 is set on the A side to remove a grid image. If the contrast is lower than the predetermined threshold, the switch 13 is set on the B side to inhibit the removal of a grid image.

As described above, according to this embodiment, in a system for two-dimensionally sampling an X-ray image and forming a digital image, an image that can be observed by the observer with little sense of incongruity without removing a grid stripe pattern from the image can be formed by setting the frequency of the grid lead members to be equal to or lower than 40% of the sampling frequency at which the spatial frequency of a stripe image originating from the grid for removing scattered rays from the image and equal to or higher than the frequency (60% of the Nyquist frequency in general) at which a grid image does not easily interfere with observation of the image by the observer and does not overlap an image component.

In addition, the filtering means 12 can choose between removal or nonremoval of a grid stripe pattern in accordance with selection through the switch 13. Since a grid stripe pattern is automatically removed in accordance with operation by the operator (observer), the application purpose of an image, imaging position, and the amplitude (intensity) of a grid stripe pattern, an appropriate image can be obtained by removing a grid stripe pattern only when required.

Each embodiment described above is merely an example in practicing the present invention. Note that the technical scope of the present invention should not be interpreted in a limited manner. That is, the present invention can be practiced in various forms without departing from the spirit and scope of the present invention.

As has been described above, according to each embodiment described above, when an X-ray image is two-dimensionally sampled to acquire a digital image, an image that can be observed by the observer with little sense of incongruity without removing a grid stripe pattern from the image can be formed by setting the spatial frequency of a stripe pattern originating from the grid for removing scattered rays from the image to a predetermined value.

In addition, since whether to remove a stripe pattern originating from the scattered ray removing grid from an image can be selected, an appropriate image can be obtained by removing a stripe pattern originating from the scattered ray removing grid.

(Fifth Embodiment)

In the above case, since the resolving power of the X-ray image receiving unit (X-ray image sensor) is not very high, the above apparatus is based on the premise that the grid pattern exhibits an almost single sine wave. This will be described below.

Recently, with technical innovation of X-ray image sensors, a scheme of directly converting an X-ray intensity distribution into a charge distribution by using, for example, a method of acquiring free electrons, generated by X-rays, using a strong electric field, has been studied and put into practice, in place of an indirect conversion scheme of converting an X-ray intensity distribution into a fluorescence distribution first and then photoelectrically converting the fluorescence distribution.

In the case of the direct conversion scheme, an aperture used to acquire X-rays as charges (electrons) is the main factor that determines resolving power, and hence a high-resolving power X-ray image sensor can be obtained. When such a high-resolving power X-ray image sensor is used, an original grid pattern is resolved more finely (harmonic components are also resolved) regardless whether the sensor is not based on the direct conversion scheme. It is therefore expected that a grid pattern in an acquired image may not exhibit a single sine wave.

Such a situation will be described with reference to FIG. 15. FIG. 15 is a graph on a one-dimensional spatial frequency axis, with the abscissa representing the spatial frequency. Referring to FIG. 15, a Nyquist frequency Fn in the middle is a Nyquist frequency set when the pixels of the sensor are regarded as pixels corresponding to spatial sampling, i.e., ½ a sampling frequency (the reciprocal of the sampling pitch) Fs.

The peak denoted by reference numeral 201 in FIG. 15 is the spatial frequency of the lead foil members of the grid, which is set to Fg=1.25Fn, for the sake of convenience. According to the sampling theorem, this frequency is expressed by a frequency equal to or lower than the Nyquist frequency, and the frequency Fm1 can be calculated as follows:

$$Fm1 = 2 \cdot Fn - Fg = 0.75Fn \tag{10}$$

This peak is denoted by reference numeral 202 in FIG. 15. If the resolving power of the sensor in use is high, a second-order harmonic 2Fg of a grid frequency Fg is sampled at the same time. A frequency Fm2 of this harmonic is calculated as follows and is denoted by reference numeral 203 in FIG. 15:

$$Fm2 = 2 \cdot Fg - 2 \cdot Fn = 0.5Fn \tag{11}$$

A third-order harmonic Fm3 is denoted by reference numeral 204 in FIG. 15 and given by $$Fm3 = 4 \cdot Fn - 3 \cdot Fg = 0.25Fn \tag{12}$$

In general, a frequency Fk on an image with respect to k-th order harmonic is expressed by $$Fk = |2 \cdot j \cdot Fn - k \cdot Fg| \tag{13}$$

(An integer j including 0 is selected to satisfy $0 \leq Fk \leq Fn$.)

As described above, when a high-resolving power sensor is used, even line spectra originating from such harmonics appear as stripe pattern information on an image. According to the conventional technique, in order to remove such stripe pattern information originating from a plurality of spatial frequencies from an image, filtering corresponding to each frequency must be done. This inevitably affects image information.

The following embodiment has been made in consideration of the above problems and explains a radiation imaging method and apparatus which facilitate removing or reducing components originating from a grid in an acquired image or can acquire an image that is easy to observe even in the presence of such components, and a design method for the apparatus.

In addition, the following embodiment explains a radiation imaging method and apparatus which facilitate removing or reducing harmonic components originating from a grid in an acquired image or can acquire an image that is easy to observe even in the presence of such components, and a design method for the apparatus.

The following embodiment explains a radiation imaging method and apparatus which can integrate a fundamental frequency component and second-order harmonic component originating from a grid in an acquired image into a substantially single spectrum, and a design method for the apparatus.

Furthermore, the following embodiment explains a radiation imaging method and apparatus which can integrate components originating from a grid in an acquired image into a substantially single spectrum, and a design method for the apparatus.

Other objects of the following embodiment will be obvious from the following description of the specification.

According to the following embodiment, image components originating from a grid in an acquired (visualized) image are integrated (converged) in a substantially single spectrum.

The fifth embodiment will be described below with reference to the accompanying drawings.

The fifth embodiment exemplifies an arrangement for converging grid stripe spectra up to at least the second-order harmonic into a substantially single spatial frequency spectrum by spatial sampling. This arrangement makes a grid stripe pattern (an image component originating from the grid) become an approximate sine wave form and prevent the occurrence of unnecessary low-frequency components. In addition, a grid pattern can be easily or properly removed, as needed, by grid pattern removal processing with subsequent filtering operation or the like.

Conditions under which the fundamental frequency (k=1) of a grid pattern component coincides with the frequency (k=2) of the second-order harmonic component in a sampled image are calculating by referring to equation (13). Since this is an absolute value computation, the following two conditions will be considered.

$$\begin{cases} 2j_1 F_n - F_g = 2j_2 F_n - 2F_g & (14\text{-}1) \\ 2j_1 F_n - F_g = 2F_g - 2j_2 F_n & (14\text{-}2) \end{cases}$$

where $j_1$ and $j_2$ are positive integers (natural numbers) including 0.

By solving equation (14-1) for Fg, the following equation is obtained:

$$Fg = 2Fn(j_2 - j_1) \tag{15}$$

This coincides with the condition described in Japanese Patent Laid-Open No. 9-75332. If Fg slightly deviates from this condition due to a manufacturing error in the grid or the like, a stripe pattern with a very low frequency is produced. This greatly damages image information and makes it difficult to remove a grid stripe pattern by filtering or the like.

By solving equation (14-2) for Fg, the following equation is obtained:

$$F_g = \frac{2}{3}(j_1 + j_2)F_n = \frac{1}{3}(j_1 + j_2)F_s \tag{16}$$

In this case, Fs=2·Fn (sampling frequency).

In this case, $(j_1+j_2)$ is a positive integer (natural number) and can take numerical values such as (⅔)Fn, (⅘)Fn, and (⁵⁄₃)Fn.

If, however, $(j_1+j_2)$ is a multiple of three, the resultant condition is the same as that represented by equation (15). Since this condition is not appropriate as described above, this case is excluded. If the grid frequency Fg is set to satisfy equation (16) when $(j_1+j_2)$ is a natural number excluding a multiple of three, there is no possibility that a low-frequency stripe pattern like that described above will be produced, even with a slight manufacturing error.

In addition, if the grid frequency is set in accordance with this condition, the fundamental frequency of the grid stripe pattern and the frequency of the second-order harmonic become almost equal to each other in the image (become a substantially single spectrum), and only a substantially single stripe pattern with a sine wave is advantageously generated in the image. The present inventor has found that when the second-order harmonic component of a grid stripe pattern in an acquired image cannot be neglected, a very good effect can be obtained by setting the grid frequency so as to satisfy equation (16).

In the case of general medical images, the sampling pitch is about 100 μm to 200 μm, and hence the Nyquist frequency Fn falls within the range of about 2.5 cyc/mm to 5 cyc/mm. The frequency Fg of a physically appropriate grid as a grid aimed at removing scattered X-rays falls within the range of about 3 cyc/mm to 10 cyc/mm. For this reason, $(j_1+j_2)=2$ exhibits a promising condition that may coincide with the condition represented by equation (16). The condition represented by $(j_1+j_2)=3$ coincides with the condition represented by equation (15), and hence is inappropriate. Therefore the condition represented by equation (17) is appropriate.

$$F_g = \frac{4}{3}F_n = \frac{2}{3}F_s \tag{17}$$

In this embodiment, by making the grid frequency almost coincide with a frequency that satisfies the condition represented by equation (16), the spectra of an essentially unnecessary grid stripe pattern in a sampled image can be intefrated to near Fs/3 (=2Fn/3). This makes it easy to remove a grid stripe pattern from an image by filtering or the like.

According to the foregoing embodiments (Japanese Patent Application No. 2000-028161 filed by the present applicant), the grid frequency Fg is set such that the frequency of an image component originating from a grid in acquired image data becomes equal to a frequency selected from the range from 50% the Nyquist frequency Fn to 80% thereof. This condition makes moire fringes (beat-like variation components) originating from a grid less noticeable even if imaging is done with the fixed grid, and includes the condition Fg=(⅔)jFn (j is a natural number excluding a multiple of three) according to this embodiments.

The solution (condition) in this embodiment which is indicated by equation (16) is a special solution obtained by also taking harmonic components (second-order harmonic component) of a grid stripe pattern into consideration, and is also made with respect to the technical problem newly found by the present inventor. This solution has the unique effect described above. Therefore, the invention described in this embodiment constitutes valid selection inventions and numerically limited inventions.

Figure 11:
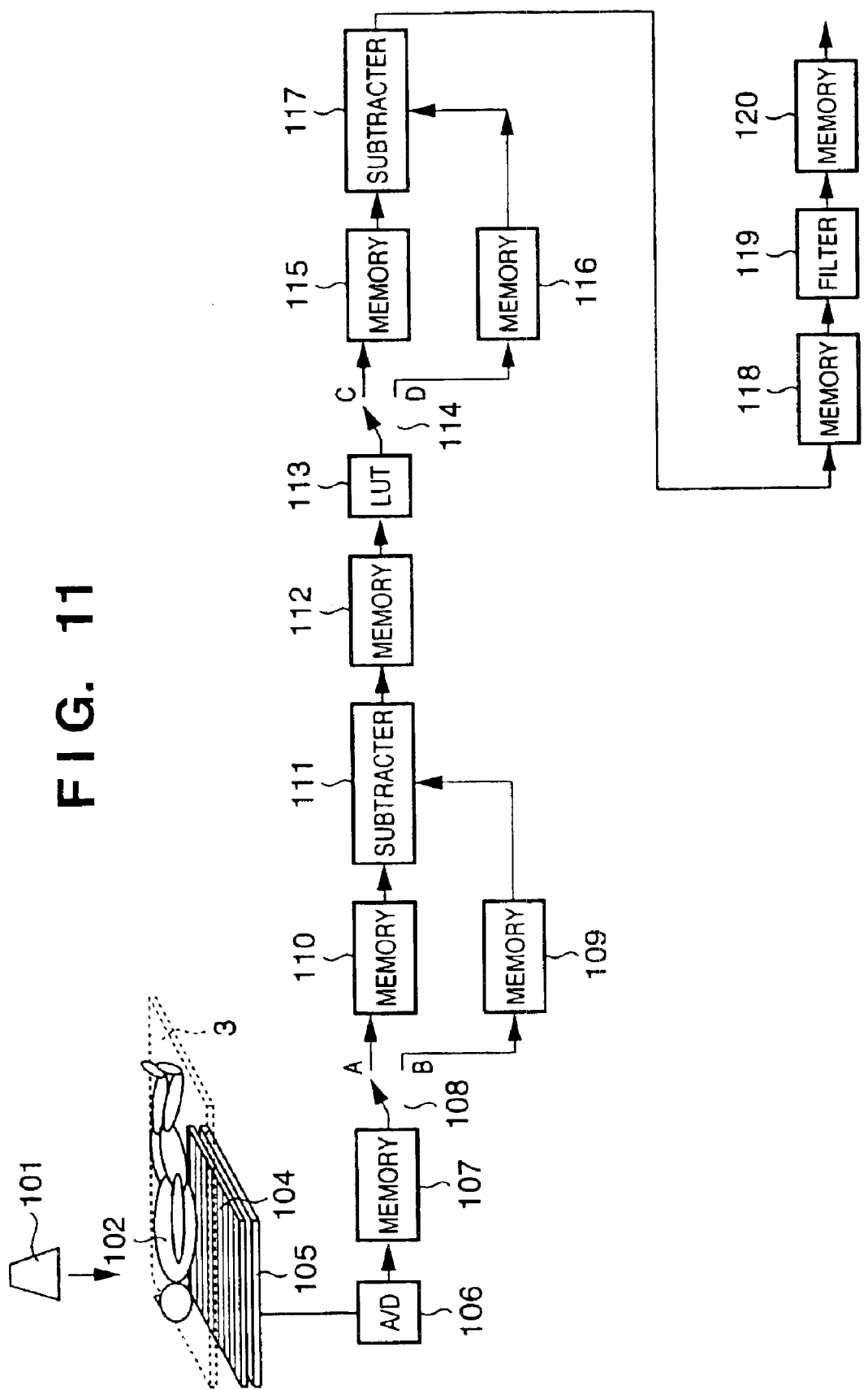
FIG. 11 is a block diagram for explaining the fifth embodiment of the present invention.

FIG. 11 is a block diagram schematically showing an X-ray image acquisition apparatus according to the fifth embodiment of the present invention. A case wherein the present invention is applied to an X-ray image acquisition apparatus for imaging an object to be imaged by using X-rays will be described below. However, the present invention can also applied to an image acquisition apparatus using radiation other than X-rays. Referring to FIG. 11, reference numeral 101 denotes an X-ray generating unit which has an X-ray tube, high voltage generator, and controller and emits X-rays in the direction indicated by the arrow; 102, an object to be imaged, typically the human body; 103, a support base such as a bed which supports a lying object such as the human body; and 104, a scattered ray removing grid having lead foil members whose intervals are optimally set. This setting will be described later.

Reference 105 denotes an X-ray image sensor which converts the intensity distribution of X-rays (X-ray image) transmitted through the object into an electric signal and is formed by using a large-size solid-stage image sensing element having a detection area (image-receiving area) constituted by a plurality of pixels arranged two-dimensionally in the form of a matrix. The X-ray image sensor 105 spatially samples an X-ray image through the detection area.

In this embodiment, as this X-ray image sensor, a sensor exhibiting little decrease in resolving power in an energy conversion process (e.g., a sensor based on the direct conversion scheme) is used. In addition, the sampling pitch (pixel pitch) of this X-ray image sensor is set to 0.16 mm. The X-ray image sensor will be referred to as a flat panel sensor or simply as a sensor hereinafter. The flat panel sensor is controlled by a controller (not shown) to sequentially scan charges proportional to the amounts of X-rays present for the respective pixels and convert them into predetermined electrical quantities (e.g., voltages or currents), thereby outputting X-ray image information as electrical quantities.

Reference numeral 106 denotes an A/D converter for converting the analog electrical quantities output from the flat panel sensor 105 into digital values; 107, a memory (storage unit) for temporarily storing a digital value from an A/D converter as image information; 108, a switch for reading out the information stored in the memory 107 and switching destinations for the information; 109, a memory (storage unit) for storing the image signal output from the X-ray image sensor 105 without irradiation of X-rays as an offset fixed pattern image; and 110, a memory (storage unit) for storing an image of the object which is obtained by actually irradiating the object with X-rays.

According to a specific imaging method, an X-ray dose measuring device (not shown) called a phototimer which monitors the amount of X-rays transmitted through an object to be imaged is used to control X-ray emission by the X-ray generating unit, and X-ray emission by the X-ray generating unit is stopped at the instant when the cumulative amount of X-rays transmitted through the object becomes a predetermined value. At the same time when X-ray emission is stopped, the controller for this X-ray image acquisition apparatus causes the flat panel sensor to start scanning, and temporarily stores image information of the object 102 in the memory 107. Thereafter, the controller sets the switch 108 to the A side to make the memory 110 store the image information. Immediately after this operation, the controller causes the flat panel sensor to store charges without emitting X-rays for the same time as the X-ray emission time determined by the above phototimer, and then makes the flat panel sensor scan. The controller then causes the memory 107 to temporarily store the resultant image information as an offset fixed pattern image. After this operation, the controller sets the switch 108 to the B side to make the memory 109 store the offset fixed pattern image from the memory 107. Reference numeral 111 denotes a subtracter which sequentially subtracts, essentially from the values of object image data in the memory 110, the values of the offset fixed pattern image data in the memory 109 at the corresponding positions; and 112, a memory (storage unit) which stores the difference (image data after offset fixed pattern correction) from the subtracter 111.

Reference numeral 113 denotes an LUT (Look Up Table) for converting image data into a logarithmic value; 114, a switch for switching destinations for data from the LUT 113; and 115, a memory (storage unit) for storing data from the switch 114 whose output destination is set to the C side. In general, image data from the memory 112 which is obtained through an object to be imaged is logarithmically converted by the LUT 113. The image data is then stored in the memory 115 through the switch 114 set to the C side.

Reference numeral 116 denotes a memory (storage unit) for storing image data when this X-ray image acquisition apparatus performs operation called calibration imaging. In this calibration imaging, imaging is performed in the same manner as described above, and the switch 114 is set to the D side. The resultant image data is then stored in the memory 116. This operation differs from the above object imaging operation in that imaging is performed by emitting X-rays without the mediacy of the object 102. With this operation, image data (simply referred to as gain variations or gain variation data) is stored in the memory 116, which constitutes gain variations (also called sensitivity variations) of a plurality of pixels constituting the flat panel sensor and the intensity distribution (shading) of X-rays emitted from the X-ray generating unit. In general, this calibration imaging is done about once every day at the start of work.

Reference numeral 117 denotes a gain corrector (subtracter) having the function of correcting image data on the basis of gain variations by subtracting the gain variation data stored in the memory 116 from the image data stored in the memory 115 for each corresponding pixel (this operation substantially equivalent to division because each data having undergone logarithmic conversion); and 118, a memory (storage unit) which stores object image data having undergone correction based on gain variations which is performed by the gain corrector 117.

Figure 12:
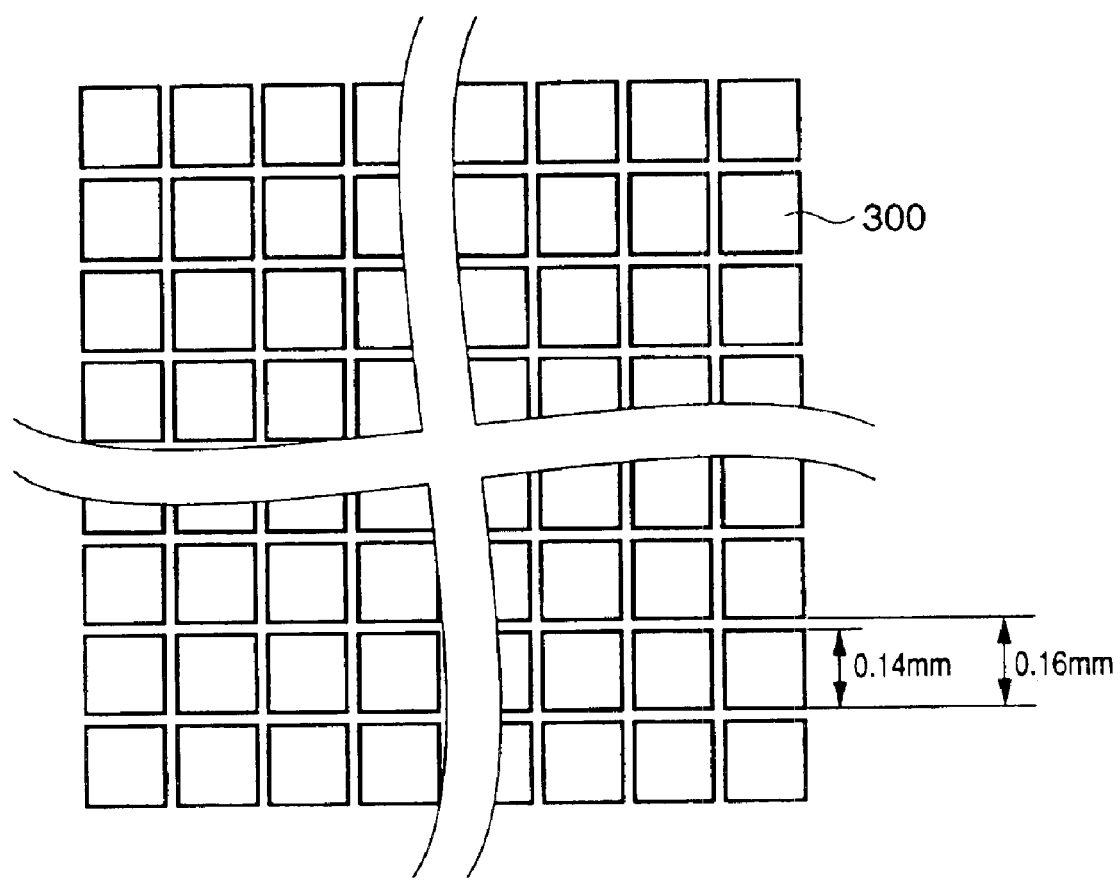
FIG. 12 is a view showing an example of a flat panel sensor.

Grid frequency (lead foil member pitch) selection will be described below. FIG. 12 schematically shows the flat panel sensor 105 according to this embodiment. Each portion 300 indicated by a rectangle represents a portion for receiving X-ray energy (charge) upon conversion, i.e., a pixel. As described above, the pixel pitch of this sensor is set to 0.16 mm. It is, however, difficult for reasons of manufacturing techniques to match the size of one side of a pixel, i.e., aperture, with the pixel pitch, and hence the size is set to 0.14 mm□. As described above, since the flat panel sensor 105 is an X-ray image sensor of the type that exhibits little decrease in rresolving power in an energy conversion process, the MTF (Modulation Transfer Function) of the sensor is mostly determined by the shape of this aperture.

Figure 13:
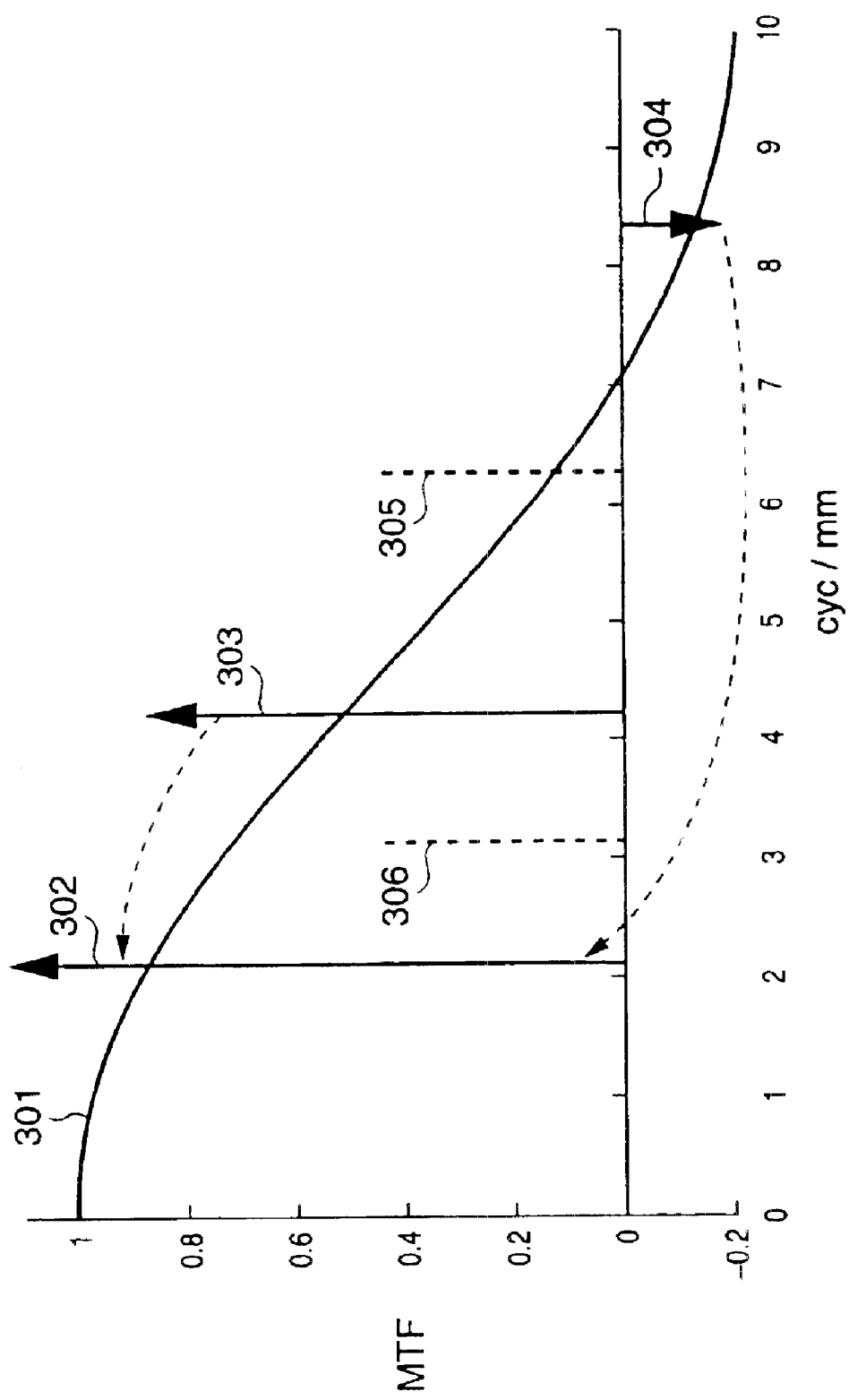

Referring to FIG. 13, reference numeral 301 denotes the MTF of the the flat panel sensor 105. In this graph, the ordinate represents the MTF; and the abscissa, the spatial frequency. This MTF corresponds to the data obtained by Fourier transformation of an aperture of 0.14 mm. Reference numeral 305 denotes the sampling frequency of the flat panel sensor 105, which is 1/0.16=6.25 cyc/mm; and 306, a Nyquist frequency which is 6.25/2=3.125 cyc/mm. In this case, the pitch of the shades of the lead foil members of the grid on the flat panel sensor is set to 0.24 mm. As a consequence, the fundamental spatial frequency of the grid stripe pattern becomes 1/0.24=4.17 cyc/mm. Referring to FIG. 13, this frequency is denoted by reference numeral 303. The grid stripe pattern is the shade pattern of the lead foil members. Strictly speaking, therefore, the shade pattern cannot be a sine wave but has a plurality of harmonics, and the frequency spectra of the shade pattern are a set of a plurality of line spectrum. Reference numeral 304 denotes the second-order harmonic of the grid stripe pattern, which has a frequency of (1/0.24)*2=8.33 cyc/mm.

As also described with reference to equation (17), if the grid strip pattern is visualized below the Nyquist frequency by sampling, the grid stripe patterns 303 and 304 are integrated into a single spectrum (line spectrum) with a frequency of 2.08 cyc/mm. In this case and general cases, since third- or higher-order harmonics are hardly resolved even by this MTF defined by only the aperture, this spectrum is the only spectrum (line spectrum) of the grid stripe pattern which appears in an image.

Referring back to FIG. 11, reference numeral 119 denotes an image processing unit which performs one-dimensional spatial filtering in a direction perpendicular to the grid stripe pattern. The image processing unit 119 selectively removes the grid stripe pattern 302 in FIG. 13. More specifically, this removal can be realized as follows. A grid stripe pattern is estimated and formed such that image components including the grid stripe pattern extracted from image dada by filtering are processed on the basis of the essential characteristics of the grid which exhibit stable periodicity. The formed grid stripe pattern is then subtracted from the original image data (this operation is substantially division because the data have undergone logarithmic conversion) (this method is disclosed in Japanese Patent Application No. 2001-134208 filed by the present applicant). Reference numeral 120 denotes a memory (storage unit) which stores image data having undergone processing by the image processing unit 119. Note that integration of the fundamental wave and second-order harmonic wave of the grid stripe pattern into substantially one spatial frequency as in this embodiment is suited to easily or properly removing the grid stripe pattern regardless of the grid stripe pattern removing method to be used.

Figure 14:
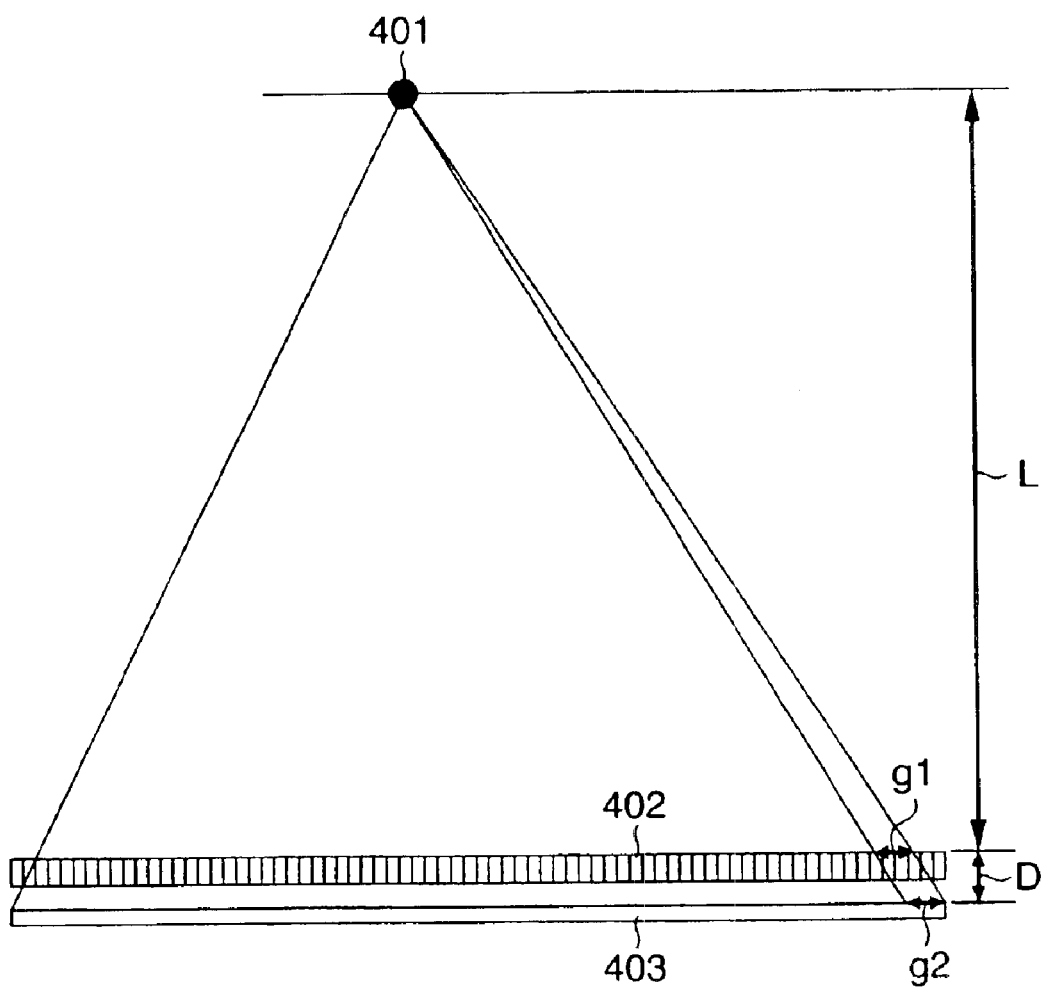
FIG. 14 is a view showing the positional relationship between an X-ray source, grid, and flat panel sensor.

FIG. 14 shows the positional relationship between an X-ray source (X-ray focal point), a grid, and a flat panel sensor. Reference numeral 401 denotes an X-ray source; 402, a grid; and 403, a flat panel sensor. Depending on the target region of an object to be imaged, the amount of scattered X-rays is small, and imaging is performed without using the grid. For this reason, an X-ray image acquisition apparatus is generally designed to selectively use a grid. For example, a detachable grid is mechanically mounted in front of the sensor. Consequently, a small gap D is spaced between the grid and the flat panel sensor, as shown in FIG. 14. In general, an X-ray source is a nearly point ray source and placed at a distance L from the grid. The plurality of lead foil members of the grid are not simply arranged parallel to each other but are arranged at angles that make them converge to the X-ray source at this distance. In this case, since L and D are about 180 cm and 10 mm, respectively, a difference owing to a magnifying effect appears between the actual pitch of the lead foil members of the grid and the pitch of the shades of the lead foil members on the flat panel sensor. Letting g1 be the actual grid pitch, and g2 be the shade grid pitch on the sensor, the pitch g2 can be calculated by $$g2=g1\cdot(1+D/L) \quad (18)$$

If the grid frequency (1/g2) on the sensor is set to 4.17 cyc/mm as in the above case, the actual grid frequency (1/g1) is preferably set to $4.17\cdot(1+D/L)\approx4.2$ cyc/mm.

A grid stripe pattern can be removed from the image data sampled by the flat panel sensor by one filtering operation, even if the spatial frequencies of the fundamental wave and second-order harmonic of the grid stripe pattern do not perfectly coincide with each other, as long as their difference falls within the range of errors of several %. Therefore, slight errors between them are allowed. This error ratio r is given by the following equation with reference to a target spatial frequency Fs/3:

$$r = \frac{|2Fs - 3Fg|}{\frac{1}{3}Fs} \quad (19)$$

In general, this error ratio preferably falls within 5%. Equation (19) is generally expressed as $$r = \frac{||J_1 Fs - Fg| - |J_2 Fs - 2Fg||}{\frac{1}{3}Fs} \quad (20)$$

(Note that $j_1$ and $j_2$ are so selected as to satisfy $|j_1 Fs - Fg| < Fs/2$ and $|j_2 Fs - 2Fg| < Fs/2$.)

Note that image processing unit 119 need not always remove a grid stripe pattern by filtering or the like unless the operator who observes the image requires so. According to this embodiment, even if a grid stripe pattern is not removed by filtering or the like, since the grid stripe pattern in the image becomes a substantially single sine wave, it does not easily interfere with observation.

This embodiment has exemplified the case wherein the ideal flat panel sensor exhibiting little decrease in resolving power in an energy conversion process is used. However, the other arrangement of this embodiment can be effectively applied to a case wherein a flat panel sensor exhibiting a substantial decrease in resolving power in an energy conversion process is used.

In addition, all the grid frequencies Fg set when $j=(j_1+j_2)$ in equation (16) takes natural numbers other than multiples of three can be used.

(Sixth Embodiment)

One of the characteristic features of a flat panel sensor is that pieces of information of a plurality of pixels adjacent to each other on the sensor can be added as analog values by accumulating the charges in the plurality of pixels on the sensor. Another characteristic feature is that the driving modes of the sensor can be switched, and the sensor can be designed to switch between the addition mode of performing such analog addition and the normal mode.

When, for example, the dynamic function (movement) of the heart is to be observed, the flat panel sensor is driven at a high frame rate to acquire so-called moving image data. In this case, for example, 2×2 adjacent pixels are handled together as one pixel, and image information is output from the flat panel sensor. If image data with higher resolution is required as a still image, the mode of the sensor is switched to the normal mode to increase the resolution.

If the data of 2×2 pixels are added, the substantially sampling pitch is doubled. As a consequence, the Nyquist frequency Fn' becomes (½)Fn. Obviously, in the addition mode, with substitution of Fn=2Fn' into equation (16), the grid frequency Fg satisfies the same condition as that in the normal mode.

In the X-ray image acquisition apparatus according to this embodiment as well, if the grid frequency Fg is so set as to satisfy equation (16) in the normal mode (note that $j=(j_1+j_2)$ is set to a natural number other than a multiple of three), and the sampling frequency decrease ratio (which represents the number of pixels to be added in a direction perpendicular to the grid foil members, e.g., 2 in the above case of addition of 2×2 pixels) due to pixel addition in the addition mode is set to a natural number other than a multiple of three, the spatial frequencies of the fundamental wave and second-order harmonic of the grid stripe pattern substantially coincide with each other in the image data sampled by the flat panel sensor regardless of the normal mode and addition mode. This makes it possible to obtain the same effect as that in the fifth embodiment.

As described above, by setting the grid frequency Fg so as to satisfy equation (16) (note that $j=(j_1+j_2)$ is set to a natural number other than a multiple of three), the frequencies of a grid stripe pattern in a visualized image can be converted (integrated) into a substantially single spectrum. This makes it possible to easily remove the grid stripe pattern from the visualized image.

Note that the fifth and sixth embodiments are only examples in practicing the present invention. It should be noted that the technical range of the present invention is not limited by these embodiments. The present invention can be practiced in various forms without departing from the technical idea and main characteristic features of the present invention.

As has been described above, according to the fifth and sixth embodiments, there are provided a radiation imaging method and apparatus which facilitate removing or reducing components originating from a grid in an acquired image or can acquire an image that is easy to observe even in the presence of such components, and a design method for the apparatus.

In addition, according to the fifth and sixth embodiments, there are provided a radiation imaging method and apparatus which facilitate removing or reducing harmonic components originating from a grid in an acquired image or can acquire an image that is easy to observe even in the presence of such components, and a design method for the apparatus.

According to the fifth and sixth embodiments, there are provided a radiation imaging method and apparatus which can integrate a fundamental frequency component and second-order harmonic component originating from a grid in an acquired image into a substantially single spectrum, and a design method for the apparatus.

Furthermore, according to the fifth and sixth embodiments, there are provided a radiation imaging method and apparatus which can integrate components originating from a grid in an acquired image into a substantially single spectrum, and a design method for the apparatus.

The present invention is not limited to the above embodiments and various changes and modifications can be made within the spirit and scope of the present invention. Therefore, to apprise the public of the scope of the present invention the following claims are made.

What is claimed is:

1. A radiation image sensing apparatus, comprising:
   a radiation tube for radiating radiation;
   a sensor for converting the radiation to an image data;
   a grid arranged in front of said sensor;
   an input unit for inputting a part information of an object which is an information concerning to a part of the object to be sensed;
   an image processing unit for performing a grid removing processing that removes a grid image from the image data; and
   a determination unit for determining whether or not the grid removing processing should be performed for the image data, based on the part information.

2. A radiation image sensing apparatus, comprising:
   a radiation tube for radiating radiation;
   a sensor for converting the radiation to an image data;
   a grid arranged in front of said sensor;
   a first image processing unit for performing a grid removing processing that removes a grid image from the image data;

a second image processing unit for performing a spatial frequency processing that detects a spatial frequency of the image data; and a determination unit for determining whether or not the grid removing processing should be performed for the image data, based on the spatial frequency.

3. A radiation image sensing apparatus, comprising:

a radiation tube for radiating radiation;

a sensor for converting the radiation to an image data;

a grid detachably arranged in front of said sensor;

an image processing unit for performing a grid removing processing that removes a grid image from the image data; and a determination unit for performing a spatial frequency analysis for the image data and determining whether or not the grid is attached in front of said sensor on the basis of a spectrum amplitude of a frequency band corresponding to the grid image, wherein said image processing unit performs the grid removing processing when it is determined that the grid is attached in front of said sensor by said determination unit.

4. A radiation image sensing apparatus, comprising:

a radiation tube for radiating radiation;

a sensor for converting the radiation to an image data;

a grid arranged in front of said sensor;

a first image processing unit for performing a grid removing processing that removes a grid image from the image data;

a second image processing unit for calculating a magnitude of a contrast of the grid image; and a determination unit for determining whether or not the contrast of the grid image is larger than a predetermined value, wherein said image processing unit performs the grid removing processing when it is determined that the contrast of the grid image is larger than the predetermined value by said determination unit.

5. A control method of a radiation image sensing apparatus which has a radiation tube for radiating radiation, a sensor for converting the radiation to an image data, and a grid arranged in front of said sensor, said method comprising the steps of:

inputting a part information of an object which is an information concerning a part of the object to be sensed;

determining whether or not a grid removing processing that removes a grid image from the image data should be performed, based on the part information; and performing the grid removing processing based on a result of said determining step.

6. A control method of a radiation image sensing apparatus which has a radiation tube for radiating radiation, a sensor for converting the radiation to an image data, and a grid arranged in front of said sensor, said method comprising the steps of:

performing a spatial frequency processing that detects a spatial frequency of the image data;

determining whether or not a grid removing processing that removes a grid image from the image data should be performed, based on the spatial frequency; and performing a grid removing processing based on a result of said determining step.

7. A control method of a radiation image sensing apparatus which has a radiation tube for radiating radiation, a sensor for converting the radiation to an image data, and a grid detachably arranged in front of said sensor, said method comprising the steps of:

performing a spatial frequency analysis for the image data and determining whether or not the grid is attached in front of said sensor on the basis of a spectrum amplitude of a frequency band corresponding to a grid image; and performing a grid removing processing that removes the grid image from the image data when it is determined that the grid is attached in front of said sensor in said determination step.

8. A control method of a radiation image sensing apparatus which has a radiation tube for radiating radiation, a sensor for converting the radiation to an image data, and a grid arranged in front of said sensor, said method comprising the steps of:

calculating a magnitude of a contrast of a grid image;

determining whether or not the contrast of the grid image is larger than a predetermined value; and performing a grid removing processing that removes the grid image from the image data when it is determined that the contrast of the grid image is larger than the predetermined value in said determination step.

9. A computer program adapted to cause a computer to perform the method according to claim 5.

10. A computer program adapted to cause a computer to perform the method according to claim 6.

11. A computer program adapted to cause a computer to perform the method according to claim 7.

12. A computer program adapted to cause a computer to perform the method according to claim 8.

* * * * *